(12) United States Patent
Samet et al.

(10) Patent No.: US 11,477,938 B2
(45) Date of Patent: Oct. 25, 2022

(54) FLEX WING MOWER

(71) Applicant: Alamo Group Inc., Seguin, TX (US)

(72) Inventors: Daniel C. Samet, Rankin, IL (US); Andrew L. Bane, Gibson City, IL (US)

(73) Assignee: Alamo Group Inc., Seguin, TX (US)

( * ) Notice: Subject to any disclaimer, the term of this patent is extended or adjusted under 35 U.S.C. 154(b) by 479 days.

(21) Appl. No.: 16/671,663

(22) Filed: Nov. 1, 2019

(65) Prior Publication Data

US 2020/0137954 A1 May 7, 2020

Related U.S. Application Data

(60) Provisional application No. 62/755,610, filed on Nov. 5, 2018.

(51) Int. Cl.
| A01D 34/66 | (2006.01) |
| A01D 34/73 | (2006.01) |
| A01D 34/74 | (2006.01) |
| A01D 34/76 | (2006.01) |

(52) U.S. Cl.
CPC .......... *A01D 34/66* (2013.01); *A01D 34/736* (2013.01); *A01D 34/74* (2013.01); *A01D 34/76* (2013.01)

(58) Field of Classification Search
CPC ...... A01D 34/66; A01D 34/736; A01D 34/74; A01D 34/76; A01D 34/86
See application file for complete search history.

(56) References Cited

U.S. PATENT DOCUMENTS

| 2,974,469 | A | * | 3/1961 | Smith | A01D 34/86 |
| | | | | | 56/13.6 |
| 3,473,302 | A | * | 10/1969 | Clay | A01D 34/661 |
| | | | | | 56/6 |
| 3,594,994 | A | * | 7/1971 | Engler | A01D 34/24 |
| | | | | | 56/307 |
| 4,538,400 | A | | 9/1985 | Hottes | |
| 4,912,915 | A | | 4/1990 | Smit | |
| 5,113,640 | A | | 5/1992 | Colistro | |
| 5,241,808 | A | * | 9/1993 | Colistro | A01D 75/30 |
| | | | | | 56/6 |
| 5,321,938 | A | | 6/1994 | LeBlanc | |
| 5,343,683 | A | | 9/1994 | Friesen | |
| 5,450,714 | A | | 9/1995 | Lurwig | |

(Continued)

FOREIGN PATENT DOCUMENTS

CA  2 527 792 A1  5/2007

OTHER PUBLICATIONS

Search Report dated Mar. 30, 2020 in related European Patent Application No. 19206762.7 (7 pages).

(Continued)

*Primary Examiner* — Abigail A Risic
(74) *Attorney, Agent, or Firm* — Pizarro Allen PC

(57) ABSTRACT

A mowing machine may include a central cutting deck generally disposed in a neutral mowing plane and a wing cutting deck pivotable with respect to the central cutting deck. A main gearbox may be connected to a wing gearbox by a wing driveline. The main gearbox may be disposed a sufficient distance forward of the central cutting deck and the wing cutting deck to permit the wing cutting deck to pivot about a hinge in a range of motion without disconnecting the wing driveline from either the main gearbox or the wing gearbox.

35 Claims, 17 Drawing Sheets

(56) References Cited

U.S. PATENT DOCUMENTS

| | | | |
|---|---|---|---|
| 5,626,007 A | 5/1997 | Harrington et al. | |
| 5,813,202 A | 9/1998 | Goman et al. | |
| 6,594,980 B2 | 7/2003 | Oka et al. | |
| 7,775,024 B2 | 8/2010 | Boyko | |
| 8,196,382 B2 | 6/2012 | Foster, III | |
| 8,209,946 B2 * | 7/2012 | Neudorf | A01D 34/661 |
| | | | 172/240 |
| 10,433,481 B2 * | 10/2019 | Welsh | A01D 34/81 |
| 10,638,664 B2 * | 5/2020 | Anderson | A01B 73/048 |
| 10,980,176 B1 * | 4/2021 | Schreurs | A01D 34/66 |
| 2011/0020101 A1 * | 1/2011 | Crane | B66C 23/06 |
| | | | 414/680 |
| 2013/0291512 A1 * | 11/2013 | Gonzalez | A01D 34/71 |
| | | | 56/255 |
| 2014/0260159 A1 | 9/2014 | Hofmann | |
| 2015/0223397 A1 * | 8/2015 | Browning | A01D 67/00 |
| | | | 56/17.1 |
| 2022/0104424 A1 * | 4/2022 | Marquardt | A01B 71/066 |

OTHER PUBLICATIONS

Examination Report dated Feb. 18, 2022 issued in corresponding European Patent Application No. 19206762.7 (9 pages).

* cited by examiner

FLEX WING MOWER

CROSS REFERENCE TO RELATED APPLICATIONS

This application claims priority to U.S. Provisional Patent Application No. 62/755,610 filed Nov. 5, 2018, the disclosure of which is incorporated herein by reference.

FIELD

This application relates generally to pull-behind mowing machines.

BACKGROUND

The mowing of brush and grass may be undertaken for a variety of reasons ranging from aesthetics to health and welfare concerns. For example, a piece of land may need to be cleared or cleaned up for the development or the reduction of conditions that are conducive to rodent and pest habitation.

U.S. Pat. No. 5,113,640 discloses a rotary mower with five blade sets. The center cutter is mounted on a center section of the mower, while two wings on opposite sides of the center section carry two cutters each. The wing sections are mounted on opposite sides of the center section by hinges. The hinges are parallel and extend in the direction of travel to allow the wings to be folded up for transport purposes. The main gearbox is located on the center section, and the driveline that connects the main gearbox to a gearbox on each wing section overlies the respective hinge and wing section. That arrangement would limit the downward range of motion of each wing section with respect to the center section.

One challenge encountered in mowing operations is that presented by uneven terrain. In such terrain, there may be steep inclines that can present a roll-over hazard for the mowing machine, especially for smaller machines. Such hazardous situations arise for many individuals on farms, residential areas, roadsides, and other such places where the individual is likely to be using a tractor to do such mowing. Steep ditches and hedge rows are but a few of the situations these individuals may encounter where uneven terrain may present a challenge to mowing safely. There is a need for an improved mowing machine that may safely accommodate uneven terrain.

SUMMARY

In some embodiments, a mowing machine configured to be pulled by a tractor in a direction of travel along a longitudinal axis of the mowing machine may include a frame; a main gearbox mounted to a forward portion of the frame, the main gearbox configured for coupling to a power takeoff of the tractor; a central cutting deck mounted to a rear portion of the frame and spaced apart from the main gearbox, the central cutting deck being generally disposed in a neutral mowing plane; a central gearbox mounted to the central cutting deck and coupled to the main gearbox with a central driveline, the central gearbox being operably coupled to a central cutting blade; a wing cutting deck pivotally connected to the central cutting deck or the frame via a hinge; a wing gearbox mounted to the wing cutting deck and coupled to the main gearbox with a wing driveline, the wing gearbox being operably coupled to a wing cutting blade; at least one wheel supporting the central cutting deck; and at least one wheel supporting the wing cutting deck; wherein the main gearbox is disposed a sufficient distance forward of the central cutting deck and the wing cutting deck to permit the wing cutting deck to pivot about the hinge in a range of motion from a maximum downward angle with respect to the neutral mowing plane to a maximum upward angle with respect to the neutral mowing plane without disconnecting the wing driveline from either the main gearbox or the wing gearbox; and wherein the central cutting deck comprises a planform shape that permits clearance of the wing driveline with respect to the central cutting deck during a downward portion of the range of motion wherein at least a portion of the wing driveline is disposed below the neutral mowing plane. In some embodiments, the wing driveline and the wing gearbox may be operable to drive the wing cutting blade throughout the range of motion. In some embodiments, the maximum downward angle may be between about 30 degrees and about 90 degrees. In some embodiments, the maximum upward angle may be about 90 degrees. In some embodiments, the wing cutting deck may be oriented at a non-orthogonal sweep angle with respect to the longitudinal axis. In some embodiments, the wing cutting deck may include a swept forward orientation. In some embodiments, the central cutting deck may be disposed at about ⅔ to about ¾ of a distance from the main gearbox to the wing cutting deck. In some embodiments, the wing cutting deck may include a first wing cutting deck disposed on a first side of the longitudinal axis, and the mowing machine may further include: a second wing cutting deck disposed on an opposite side of the longitudinal axis from the first wing cutting deck, the second wing cutting deck pivotally connected to the central cutting deck or the frame about a second hinge; a second wing gearbox mounted to the second wing cutting deck and coupled to the main gearbox with a second wing driveline, the second wing gearbox being operably coupled to a second wing cutting blade; and at least one wheel supporting the second wing cutting deck; wherein the main gearbox is disposed a sufficient distance forward of the central cutting deck and the second wing cutting deck to permit the second wing cutting deck to pivot about the second hinge in a second range of motion from the maximum downward angle with respect to the neutral mowing plane to the maximum upward angle with respect to the neutral mowing plane without disconnecting the second wing driveline from either the main gearbox or the second wing gearbox; and wherein the central cutting deck comprises a planform shape that permits clearance of the second wing driveline with respect to the central cutting deck during a downward portion of the second range of motion wherein at least a portion of the second wing driveline is disposed below the neutral mowing plane.

In some embodiments, a mowing machine configured to be pulled by a tractor in a direction of travel along a longitudinal axis of the mowing machine may include a frame; a main gearbox mounted to a forward portion of the frame, the main gearbox configured for coupling to a power takeoff of the tractor; a central cutting deck mounted to a rear portion of the frame and spaced apart from the main gearbox, the central cutting deck being generally disposed in a neutral mowing plane; a central gearbox mounted to the central cutting deck and coupled to the main gearbox with a central driveline, the central gearbox being operably coupled to a central flail rotor having a plurality of flail cutters and being rotatable about a first axis; a wing cutting deck pivotally connected to at least one of the central cutting deck and the frame via a hinge; a wing gearbox mounted to the wing cutting deck and coupled to the main gearbox with a wing driveline, the wing gearbox being operably coupled to a wing flail rotor having a plurality of flail cutters and being rotatable about a second axis; at least one wheel supporting the central cutting deck; and at least one wheel supporting the wing cutting deck; wherein the main gearbox is disposed a sufficient distance forward of the central cutting deck and the wing cutting deck to permit the wing cutting deck to pivot about the hinge in a range of motion from a maximum downward angle with respect to the neutral mowing plane to a maximum upward angle with respect to the neutral mowing plane without disconnecting the wing driveline from either the main gearbox or the wing gearbox; and wherein the central cutting deck includes a planform shape that permits clearance of the wing driveline with respect to the central cutting deck during a downward portion of the range of motion wherein at least a portion of the wing driveline is disposed below the neutral mowing plane. In some embodiments, the wing driveline and the wing gearbox may be operable to drive the wing flail rotor throughout the range of motion. In some embodiments, the maximum downward angle may be between about 30 degrees and about 90 degrees, and the maximum upward angle may be about 90 degrees. In some embodiments, the first axis and the second axis may be substantially parallel to each other, and in some embodiments the first axis and the second axis may be substantially perpendicular to the longitudinal axis. In some embodiments, the second axis may be not substantially perpendicular to the longitudinal axis.

In some embodiments, a mowing machine configured to be pulled by a tractor in a direction of travel along a longitudinal axis of the mowing machine may include: a frame; a main gearbox mounted to a forward portion of the frame, the main gearbox configured for coupling to a power takeoff of the tractor; a central cutting deck mounted to a rear portion of the frame and spaced apart from the main gearbox, the central cutting deck being generally disposed in a neutral mowing plane; a central gearbox mounted to the central cutting deck and coupled to the main gearbox with a central driveline, the central gearbox being operably coupled to a central flail rotor having a plurality of flail cutters and being rotatable about a first axis; a wing cutting deck pivotally connected to at least one of the central cutting deck and the frame via a hinge; a wing gearbox mounted to the wing cutting deck and coupled to the main gearbox with a wing driveline, the wing gearbox being operably coupled to a wing flail rotor having a plurality of flail cutters and being rotatable about a second axis; at least one wheel supporting the central cutting deck; and at least one wheel supporting the wing cutting deck; wherein the main gearbox is disposed a sufficient distance forward of the central cutting deck and the wing cutting deck to permit the wing cutting deck to pivot about the hinge in a range of motion from a maximum downward angle of about 90 degrees with respect to the neutral mowing plane to a maximum upward angle of about 90 degrees with respect to the neutral mowing plane without disconnecting the wing driveline from either the main gearbox or the wing gearbox. In some embodiments, the mowing machine may further include a counterweight attached to the frame at a location substantially opposite the wing cutting deck. In some embodiments, the wing gearbox may be disposed proximate and inboard of the hinge. In some embodiments, the main gearbox may include a connection to the wing driveline that is substantially parallel to the longitudinal axis.

In some embodiments, a mowing machine configured to be pulled by a tractor in a direction of travel along a longitudinal axis of the mowing machine may include a frame; a main gearbox mounted to a forward portion of the frame, the main gearbox configured for coupling to a power takeoff of the tractor; a central cutting deck mounted to a rear portion of the frame and spaced apart from the main gearbox, the central cutting deck being generally disposed in a neutral mowing plane; a central gearbox mounted to the central cutting deck and coupled to the main gearbox with a central driveline, the central gearbox being operably coupled to a central cutting tool; a wing cutting deck pivotally connected to the central cutting deck or the frame via a hinge; a wing gearbox mounted to the wing cutting deck and coupled to the main gearbox with a wing driveline, the wing gearbox being operably coupled to a wing cutting tool; at least one wheel supporting the central cutting deck; and at least one wheel supporting the wing cutting deck; wherein the main gearbox is disposed a sufficient distance forward of the central cutting deck and the wing cutting deck to permit the wing cutting deck to pivot about the hinge in a range of motion from a maximum downward angle with respect to the neutral mowing plane to a maximum upward angle with respect to the neutral mowing plane without disconnecting the wing driveline from either the main gearbox or the wing gearbox; and wherein the central cutting deck includes a planform shape that permits clearance of the wing driveline with respect to the central cutting deck during a downward portion of the range of motion wherein at least a portion of the wing driveline is disposed below the neutral mowing plane.

In some embodiments, the central cutting tool may be selected from a rotary cutting blade and a flail rotor having a plurality of flail cutters, and the wing cutting tool may be selected from a rotary cutting blade and a flail rotor having a plurality of flail cutters.

In some embodiments, the wing driveline and the wing gearbox may be operable to drive the wing cutting tool throughout the range of motion.

In some embodiments, the maximum downward angle may be between about 30 degrees and about 90 degrees.

In some embodiments, the maximum upward angle may be about 90 degrees.

In some embodiments, the wing cutting deck may be oriented at a non-orthogonal sweep angle with respect to the longitudinal axis.

In some embodiments, the wing cutting deck may have a swept forward orientation.

In some embodiments, the central cutting deck may be disposed at about ⅔ to about ¾ of a distance from the main gearbox to the wing cutting deck.

In some embodiments, the wing cutting deck may include a first wing cutting deck disposed on a first side of the longitudinal axis, and the mowing machine may further include a second wing cutting deck disposed on an opposite side of the longitudinal axis from the first wing cutting deck, the second wing cutting deck pivotally connected to the central cutting deck or the frame about a second hinge; a second wing gearbox mounted to the second wing cutting deck and coupled to the main gearbox with a second wing driveline, the second wing gearbox being operably coupled to a second wing cutting tool; and at least one wheel supporting the second wing cutting deck; wherein the main gearbox is disposed a sufficient distance forward of the central cutting deck and the second wing cutting deck to permit the second wing cutting deck to pivot about the second hinge in a second range of motion from the maximum downward angle with respect to the neutral mowing plane to the maximum upward angle with respect to the neutral mowing plane without disconnecting the second wing driveline from either the main gearbox or the second wing gearbox; and wherein the central cutting deck includes a planform shape that permits clearance of the second wing driveline with respect to the central cutting deck during a downward portion of the second range of motion wherein at least a portion of the second wing driveline is disposed below the neutral mowing plane.

In some embodiments, the central cutting tool may include a first flail rotor having a plurality of flail cutters and being rotatable about a first axis; the wing cutting tool may include a second flail rotor having a plurality of flail cutters and being rotatable about a second axis; and the first axis and the second axis may be substantially parallel to each other.

In some embodiments, the first axis and the second axis may be substantially perpendicular to the longitudinal axis.

In some embodiments, the central cutting tool may include a first flail rotor having a plurality of flail cutters and being rotatable about a first axis; the wing cutting tool may include a second flail rotor having a plurality of flail cutters and being rotatable about a second axis; wherein the second axis is not substantially perpendicular to the longitudinal axis.

In some embodiments, the mowing machine may further include a counterweight attached to the frame at a location substantially opposite the wing cutting deck.

In some embodiments, the wing gearbox may be disposed proximate and inboard of the hinge.

In some embodiments, the main gearbox may include a connection to the wing driveline that is substantially parallel to the longitudinal axis.

DETAILED DESCRIPTION

Figure 1:
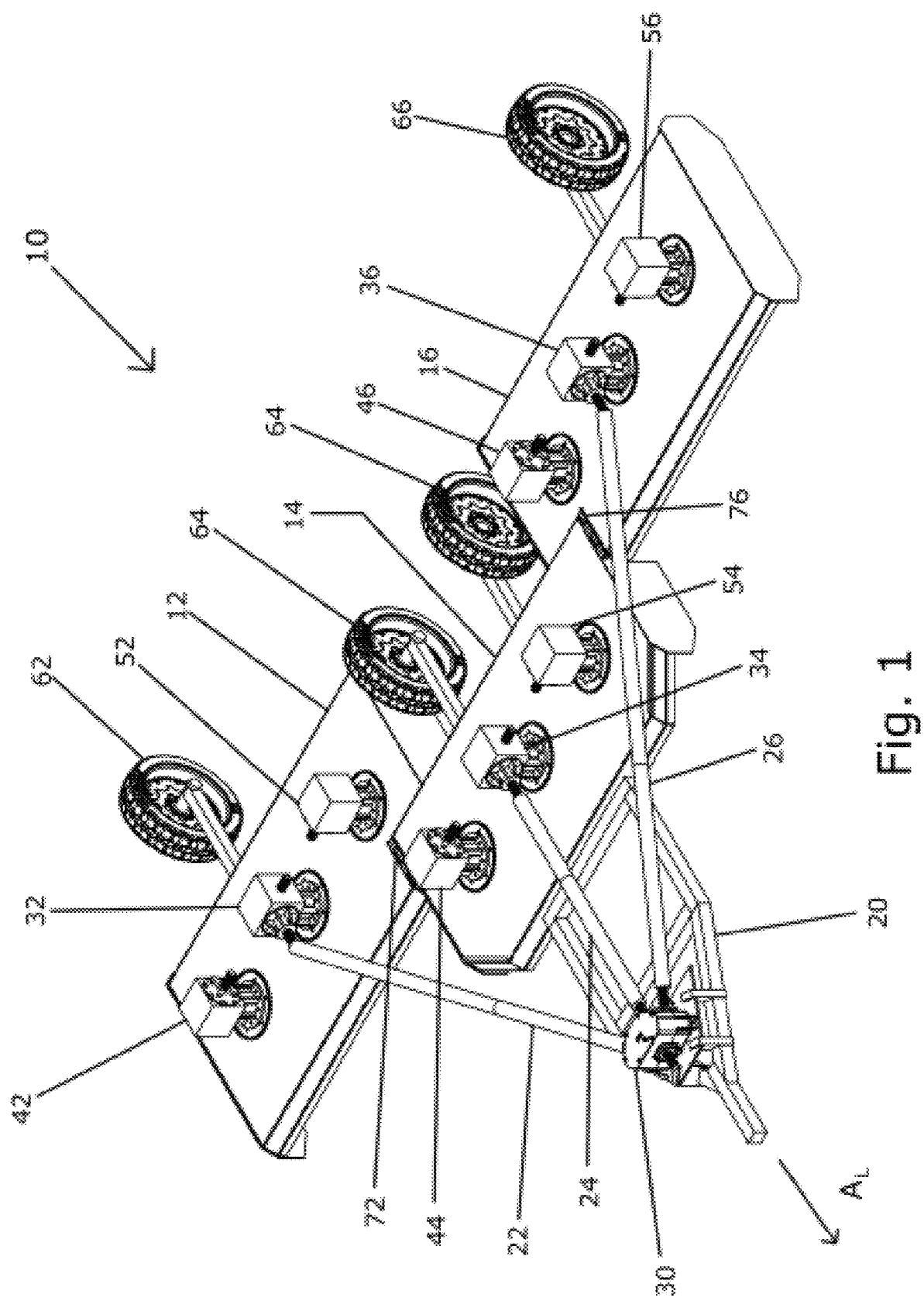
FIG. 1 is a top perspective view that illustrates a first embodiment of an adjustable wing mowing machine.

The following terms as used herein should be understood to have the indicated meanings unless the context requires otherwise.

When an item is introduced by "a" or "an," it should be understood to mean one or more of that item.

"About" means plus or minus 5%.

"Comprises" means includes but is not limited to.

"Comprising" means including but is not limited to.

"Having" means including but not limited to.

A "hinge" may be any connection that permits pivotal movement of the components connected by the hinge with respect to one another. For example, a hinge may include one or more pin connections, rod and sleeve connections, ball and socket connections, or the like.

"Neutral mowing plane" refers to a reference plane in which a central cutting deck of a mowing machine is generally disposed for the sake of comparing an orientation of a wing cutting deck with respect to the central cutting deck. For example, a neutral mowing plane may be a plane in which a top surface of a central cutting deck is generally disposed, with the understanding that a top surface of a central cutting deck (or a wing cutting deck) may or may not be completely planar. In some embodiments, a neutral mowing plane may be a plane in which an axis of a hinge is disposed, wherein a wing cutting deck is pivotally attached to a central cutting deck via the hinge such that the wing cutting deck may be pivotally rotated about the hinge. In some embodiments, a neutral mowing plane may be a plane in which one or more cutting blades of a central cutting deck are generally disposed.

"Right", "left", and "center" references are from a perspective of an individual facing in the direction of forward travel of the mowing machine.

As described in detail below, the present application is directed to a winged mowing machine that is useful for the mowing of grass and brush, and the trimming of shrubs and hedges (all such activity is generally referred to herein as mowing), most especially when such mowing may be done on terrain in which there may be a need to perform the task at an angle from a neutral mowing plane. As the winged mowing machine may include a central cutting deck and one or more wing cutting decks hinged to the central cutting deck, the mowing machine may be utilized in situations requiring the one or more wing cutting decks to be oriented at an angle with respect to the central cutting deck. For exemplary purposes, an embodiment of a winged mowing machine will be generally described as being removably coupled to a power-takeoff device of a tractor. Persons of ordinary skill in the art will understand that a mowing machine as described herein may be utilized with any suitable vehicle that contains a power-takeoff device, including but not limited to lawn tractors, UTVs, ATVs, trucks, or other suitable prime movers. Likewise, persons of ordinary skill in the art will understand that mowing machines as described herein may have any suitable cutting mechanisms, such as rotary cutters, flail cutters, or a combination thereof.

As shown in FIG. 1, a winged mowing machine 10 may comprise several main components, including a frame 20 and a central cutting deck 14, a left wing cutting deck 16, and a right wing cutting deck 12 supported by frame 20. Frame 20 may include a tongue and hitch (not shown) suitable for attachment to a tractor or other prime mover (generally referred to herein as a tractor) and a main gearbox 30 disposed at a forward top face of frame 20. Gearbox 30 may be connected to a power take off (PTO) of a tractor (not shown) either directly or by an intermediate coupling device, depending on the design and dimensions of the tractor. Main gearbox 30 may transfer power from the PTO to a central gearbox 32, 34, and 36 on each respective cutting deck 12, 14, and 16 via respective drivelines 22, 24, and 26 in order to power cutting blades in each respective cutting deck as described further below.

Central cutting deck 14 may be mechanically joined to frame 20, such as by welded connections or bolted connections, for example. However, other joining methods familiar to one skilled in the art may also be utilized in place of welding or bolting, or a combination of such methods may be used. Central cutting deck 14 may be joined to wing cutting decks 12 and 16 by means of hinges 72 and 76 such that the wing cutting decks 12, 16 may respectively rotate about the hinges 72, 76 into positions above and below the neutral mowing plane. Although hinges 72, 76 are shown generally parallel to longitudinal axis $A_L$, which is generally aligned with the direction of travel, in some embodiments hinges 72, 76 may not be parallel to longitudinal axis $A_L$. Wing cutting decks 12 and 16 may be respectively supported by one or more wheels 62 and 66 depending from the respective decks as shown. Central cutting deck 14 may be supported by one or more wheels 64 depending from central cutting deck 14 as shown.

Figure 2:
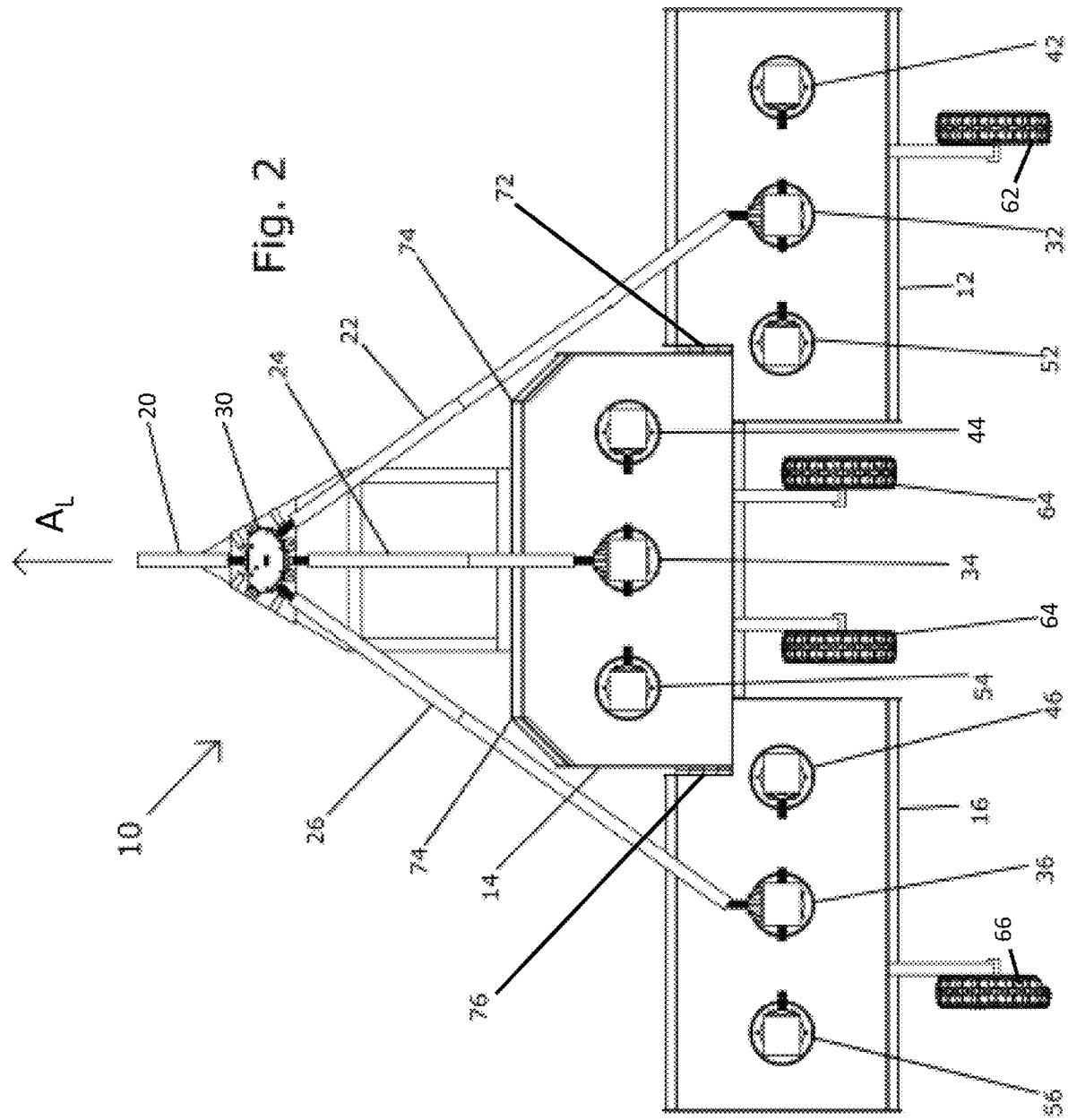
FIG. 2 is a top plan view of the adjustable wing mowing machine of FIG. 1.
Figure 4:
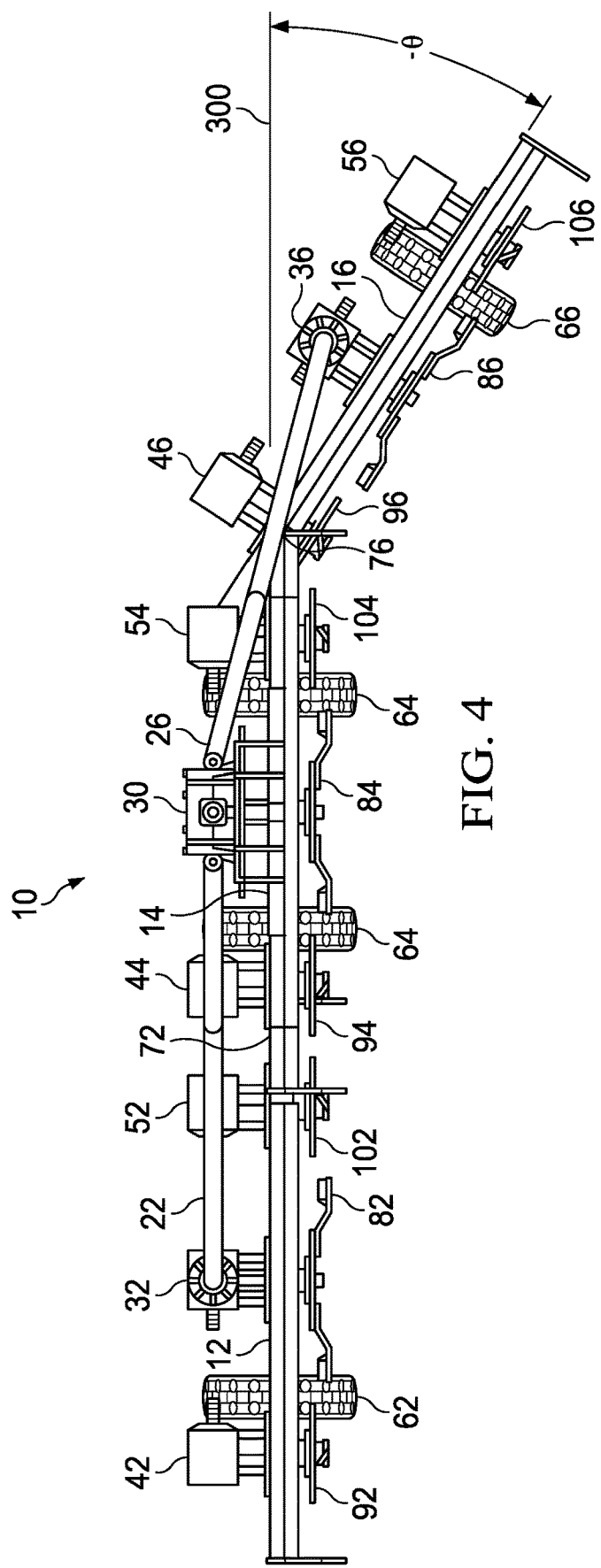
FIG. 4 is a front elevational view of the adjustable wing mowing machine of FIG. 1 shown with one wing configured downward below a neutral mowing plane.

As shown in FIG. 2, central cutting deck 14 may have a central gearbox 34 disposed at a top face thereof. Gearbox 34 may be coupled to main gearbox 30 by means of driveline 24 wherein power is transferred from gearbox 30 to gearbox 34. Additionally, central cutting deck 14 may have a plurality of secondary gearboxes 44 and 54 disposed on a top face thereof. Although two secondary gearboxes are shown for exemplary purposes, any number of secondary gearboxes may reside on a cutting deck. In some embodiments, no secondary gearboxes may be present. In some embodiments, the secondary gearboxes 44, 54 may be coupled to gearbox 34 or one another by means of secondary drivelines (not shown) so as to form a network of gearboxes ultimately powered by main gearbox 30. In some embodiments, central cutting deck 14 may have truncated (e.g., angled or curved) forward outboard edges 74 to form clearance zones to allow drivelines 22 and 26 to travel through a wide range of movement passing through the neutral mowing plane as wing cutting decks 12, 16 are pivoted about hinges 72, 76 without interference between cutting deck 14 and drivelines 22, 26. Such a configuration may enable an overall length of mowing machine 10 to be minimized while achieving the desired clearance between central cutting deck 14 and drivelines 22, 26. In other embodiments, a desired range of movement of wing cutting decks 12, 16 and such clearance may be achieved without truncated forward outboard edges of central cutting deck 14 if the longitudinal distance between main gearbox 30 and wing gearbox 32, 36 is sufficiently large. Either way, such configurations may allow wing cutting decks 12, 16 to be placed in operational downward positions (e.g., as illustrated in FIG. 4) at much greater angles than would otherwise be possible, which may greatly expand the range of sloping terrains that may be mowed.

Wing cutting decks 12 and 16 may also have a central gearbox 32 and 36, respectively, disposed at a top face of the respective cutting decks. Gearbox 32 may be coupled to main gearbox 30 by means of driveline 22 wherein power is transferred from gearbox 30 to gearbox 32. Gearbox 36 may be similarly coupled to main gearbox 30 by means of driveline 26. Wing cutting decks 12 and 16 may have a plurality of secondary gearboxes disposed on a top face of the respective cutting decks. Although a set of two secondary gearboxes 42 and 52 on wing cutting deck 12 and secondary gearboxes 46 and 56 on wing cutting deck 16 are shown for exemplary purposes, any number of secondary gearboxes (or no secondary gearboxes) may reside on a wing cutting deck. Secondary gearboxes 42 and 52 may be coupled to central gearbox 32, and secondary gearboxes 46 and 56 may be coupled to central gearbox 36. In some embodiments, secondary gearboxes may also couple to one another to form a network of gearboxes wherein the network is ultimately powered from main gearbox 30. Secondary gearboxes may be coupled to the respective central gearbox, one another, or both by means of secondary drivelines (not shown).

Figure 3:
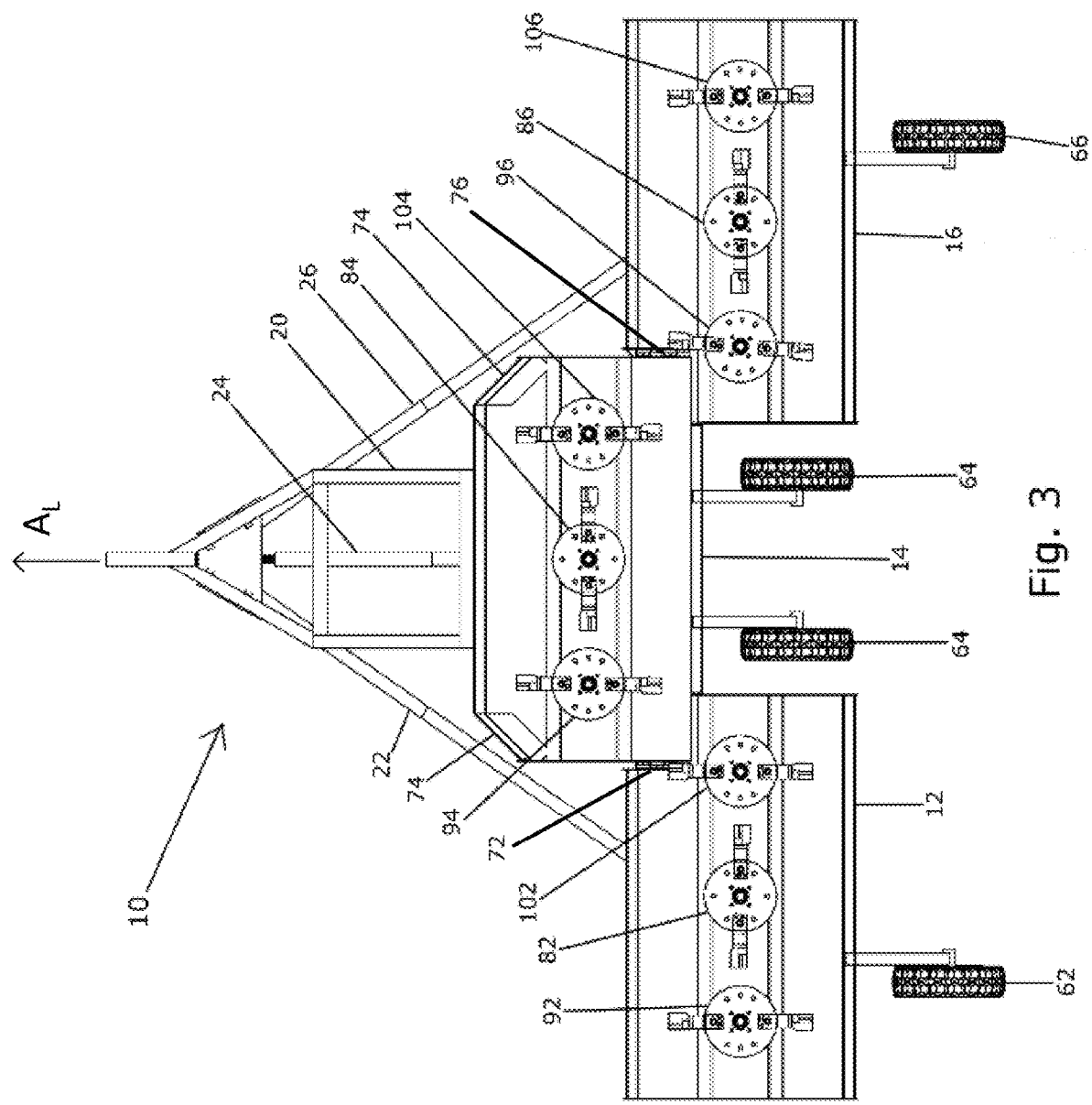
FIG. 3 is a bottom plan view of the adjustable wing mowing machine of FIG. 1.

As shown in FIG. 3, central cutting deck 14 may have one or a plurality of rotating cutting blades disposed below the deck. For exemplary purposes, central cutting deck 14 is shown with a set of three blades 84, 94, and 104. In some embodiments, the number of blades included on an underside of a deck may correspond to the number of gearboxes disposed on a top side of the deck. For example, each blade 84, 94, and 104 may be associated with a respective gearbox 34, 44, and 54 on a top side of central cutting deck 14 (see FIG. 2) wherein a gearbox imparts rotational motion to an associated blade by means of a driveshaft traversing through the deck and onto which the blade is mounted. In some embodiments, the cutting area of adjacent blades may overlap so as to prevent gaps in the cutting pattern of the deck as the deck is pulled forward during mowing operations. Such an overlap may be about 6 inches, for example, or other suitable distance. To achieve such an overlap at a uniform cutting height, in some embodiments blades 84, 94, and 104 may be timed such that adjacent blades do not share the same rotational position concurrently to avoid blade interference. Similarly, wing cutting deck 12 may have a similar blade configuration as central cutting deck 14 wherein wing cutting deck 12 includes blades 82, 92, and 102 respectively driven by gearboxes 32, 42, 52. Likewise, wing cutting deck 16 may have a similar blade configuration as central cutting deck 14 wherein wing cutting deck 16 includes blades 86, 96, and 106 respectively driven by gearboxes 36, 46, 56.

Continuing to refer to FIG. 3, it can be seen that wing cutting decks 12 and 16 may be disposed in an offset and overlapped position with reference to central cutting deck 14. As shown, the forward edge of each wing cutting deck 12, 16 may be offset rearward from the forward edge of central cutting deck 14. In some embodiments, the forward edges of wing cutting decks 12 and 16 may be substantially in line with one another and approximately disposed toward the rear one-third of central cutting deck 14. Wing cutting decks 12 and 16 may have an overlap with central cutting deck 14 by means of a cut-out of an inboard forward corner of each wing cutting deck. Such a cut-out may approximately align an outer edge of central cutting deck 14 to inner blades 102 and 96 of the respective wing cutting deck 12, 16 such that the mowing paths of blades 94 and 102 overlap and the mowing paths of blades 104 and 96 overlap. In some embodiments, an inner edge of wing cutting decks 12 and 16 may approximately align with outer blades 94 and 104 of central cutting deck 14. Such an overlap of decks as created by said cut-outs may create an overlap of the cutting paths of wing cutting decks 12 and 16 and central cutting deck 14. In some embodiments, blades 102 and 96 may be timed so as to avoid interference with blades 94 and 104, respectively.

Figure 5:
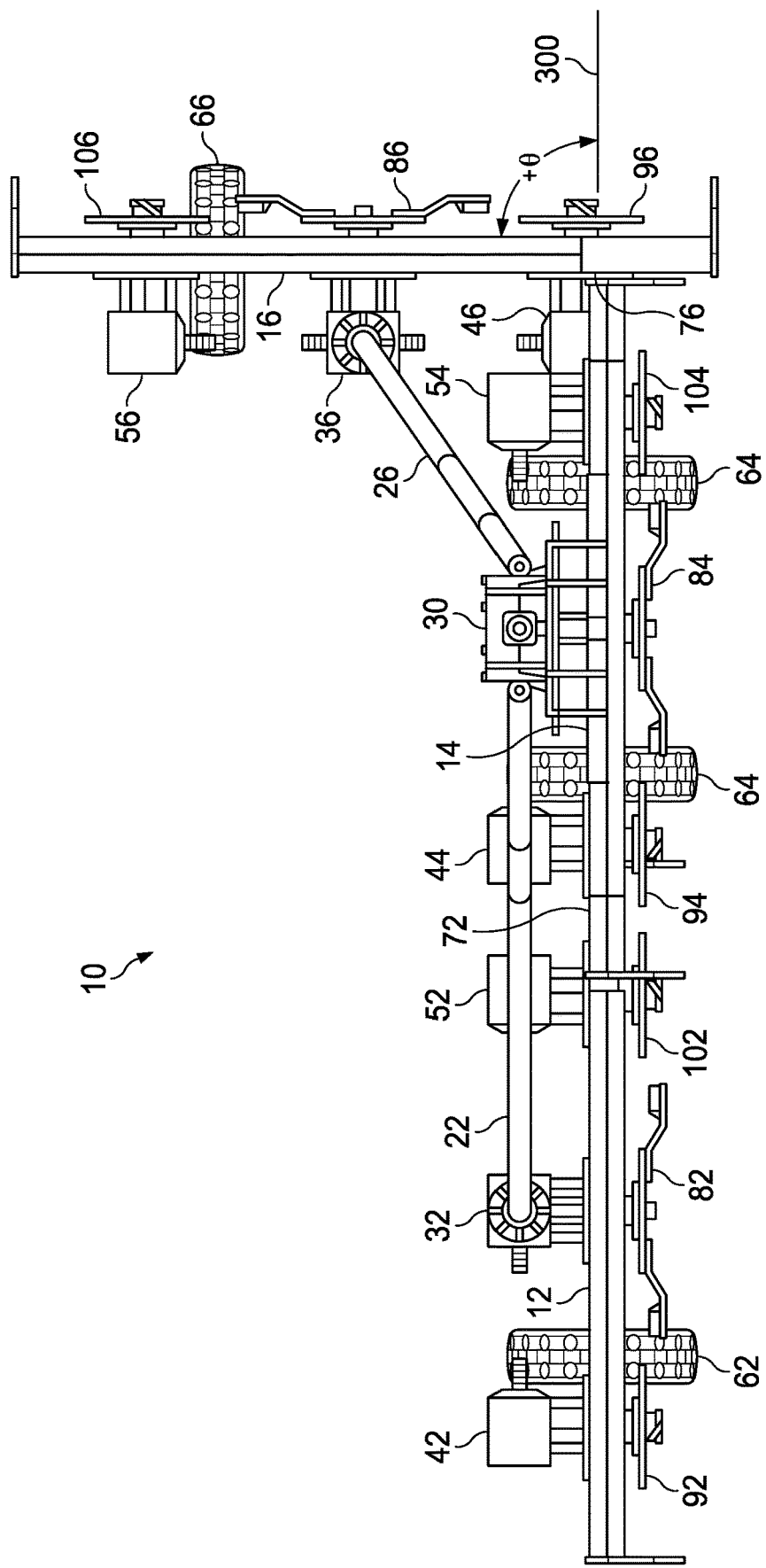
FIG. 5 is a front elevational view of the adjustable wing mowing machine of FIG. 1 shown with one wing configured upward and normal to a neutral mowing plane.

Due to hinges 72, 76 and the location of main gearbox 30 sufficiently forward of central cutting deck 14 and wing cutting decks 12, 16 (e.g., in some embodiments, central cutting deck 14 may be located at about ⅔ the distance from gearbox 30 to wing cutting decks 12, 16, or other suitable proportion), as well as the clearance zones between central cutting deck 14 and drivelines 22 and 26, wing cutting deck 12 and wing cutting deck 16 may rotate a substantial amount in relation to central cutting deck 14. As shown in FIG. 4, all or a substantial portion of a wing cutting deck (e.g., wing cutting deck 12 or 16) may rotate below the neutral mowing plane 300 to form a negative angle θ in relation to central cutting deck 14. Negative angle θ may include a range of motion from about 0 to negative 30 degrees, or about 0 to negative 45 degrees, or about 0 to negative 60 degrees, or about 0 to negative 90 degrees, for example, and in some embodiments the blades, drivelines, and gearboxes of the respective wing cutting deck may remain operational for mowing throughout the entire range of motion. Additionally, referring to FIG. 5, it may be seen that a wing cutting deck (e.g., wing cutting deck 12 or 16) may rotate above the neutral mowing plane 300 to form a positive angle θ in relation to central cutting deck 14. Positive angle θ may include a range of motion from about 0 to 30 degrees, or about 0 to 45 degrees, or about 0 to 60 degrees, or about 0 to 90 degrees, for example, and in some embodiments the blades, drivelines, and gearboxes of the respective wing cutting deck may remain operational for mowing throughout the entire range of motion. For example, with wing cutting deck 12 or 16 folded upward in a positive 90-degree configuration, a vertical hedge may be mowed. Such a configuration also enables mowing machine 10 to be placed in a compact transport position (e.g., with wing cutting decks 12 and 16 folded upward in a positive 90-degree configuration) without requiring disconnection of the drivelines 22, 26 from the respective gearboxes 32, 36 or from main gearbox 30. Such negative and positive rotation of wing cutting decks 12, 16 with respect to central cutting deck 14 may allow mowing machine 10 to readily adapt to uneven terrain with little or no input from a user. Alternatively, such negative or positive rotational configurations of wing cutting decks 12, 16 may be set by a user, either manually or via a control system. Although two wing cutting decks 12 and 16 are illustrated, some embodiments may include only one or the other of wing cutting decks 12 and 16.

Figure 6:
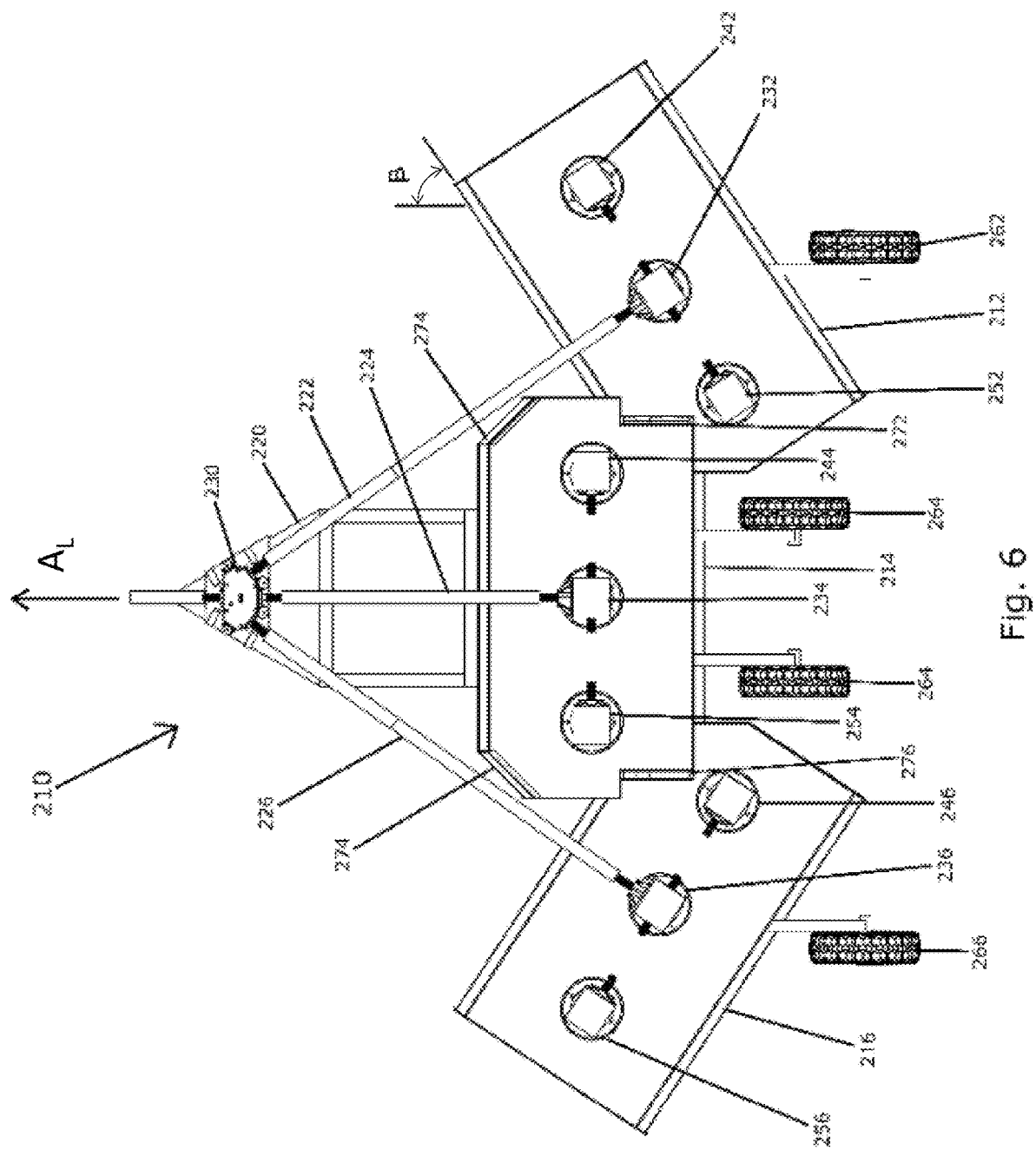
FIG. 6 is a top plan view of another embodiment of an adjustable wing mowing machine having swept forward wing decks.

As shown in FIG. 6, a winged mowing machine 210 may comprise several main components, including a frame 220, a central cutting deck 214 attached to frame 220, a swept left wing cutting deck 216 hinged to central cutting deck 214, and a swept right wing cutting deck 212 hinged to central cutting deck 214. Alternatively, in some embodiments, frame 220 may include hinged portions to which swept left wing cutting deck 216 and swept right wing cutting deck 212 are respectively attached to achieve pivotal motion of the wing cutting decks as described further herein. Frame 220 may include a tongue and hitch (not shown) suitable for attachment to a tractor and a main gearbox 230 disposed at a top forward portion of frame 220. Gearbox 230 may be connected to a power take off (PTO) of a tractor (not shown) either directly or by an intermediate coupling device, depending on the design and dimensions of the tractor. Gearbox 230 may transfer power from the PTO to a central gearbox 232, 234, and 236 on each respective cutting deck 212, 214, and 216 via respective drivelines 222, 224, and 226 to power one or more cutting blades in each respective cutting deck.

Central cutting deck 214 may be mechanically joined to frame 220, such as by welded connections or bolted connections, for example. However, other joining methods familiar to one skilled in the art may also be utilized in place of welding or bolting, or a combination of such methods may be used. Central cutting deck 214 may be joined to swept wing cutting decks 212 and 216 by means of hinges 272 and 276 such that the swept wing cutting decks 212, 216 may respectively rotate about the hinges 272, 276 into positions above and below the neutral mowing plane. Although hinges 272, 276 are shown generally parallel to longitudinal axis $A_L$, in some embodiments hinges 272, 276 may not be parallel to longitudinal axis $A_L$. Swept wing cutting decks 212 and 216 may be respectively supported by one or more wheels 262 and 266 attached to the respective deck as shown. Central cutting deck 214 may be supported by one or more wheels 264 depending from central cutting deck 214 as shown.

Continuing to refer to FIG. 6, central cutting deck 214 may have a central gearbox 234 disposed at a top face thereof. Gearbox 234 may be coupled to main gearbox 230 by means of driveline 224 wherein power is transferred from gearbox 230 to gearbox 234. Additionally, central cutting deck 214 may have one or more secondary gearboxes 244 and 254 disposed on a top face thereof. Although two secondary gearboxes are shown for exemplary purposes, any number of secondary gearboxes may reside on a cutting deck. In some embodiments, no secondary gearboxes may be present. In some embodiments, the secondary gearboxes 244, 254 may be coupled to gearbox 234 or one another by means of secondary drivelines (not shown) so as to form a network of gearboxes ultimately powered by main gearbox 230. In some embodiments, central cutting deck 214 may have truncated (e.g., angled or curved) forward outboard edges 274 to form clearance zones to allow drivelines 222 and 226 to travel through a wide range of movement as swept wing cutting decks 212, 216 are pivoted about hinges 272, 276 without interference between cutting deck 214 and drivelines 222, 226. However, as discussed above in connection with mower 10, some embodiments may achieve the desired range of motion and clearance without truncated forward outboard edges on central cutting deck 214.

Swept wing cutting decks 212 and 216 may also have a central gearbox 232 and 236, respectively, disposed at a top face of the respective cutting decks. Gearbox 232 may be coupled to main gearbox 230 by means of driveline 222 wherein power is transferred from gearbox 230 to gearbox 232. Gearbox 236 may be similarly coupled to main gearbox 230 by means of driveline 226. Swept wing cutting decks 212 and 216 may have one or a plurality of secondary gearboxes disposed on a top face of the respective cutting decks. Although a set of two secondary gearboxes 242 and 252 on swept wing cutting deck 212 and secondary gearboxes 246 and 256 on swept wing cutting deck 216 are shown for exemplary purposes, any number of secondary gearboxes (or no secondary gearboxes) may reside on a swept wing cutting deck. Secondary gearboxes 242 and 252 may be coupled to central gearbox 232, and secondary gearboxes 246 and 256 may be coupled to central gearbox 236. In some embodiments, secondary gearboxes may also couple to one another to form a network of gearboxes wherein the network is ultimately powered from main gearbox 230. Secondary gearboxes may be coupled to the respective central gearbox, one another, or both by means of secondary drivelines (not shown).

Figure 7:
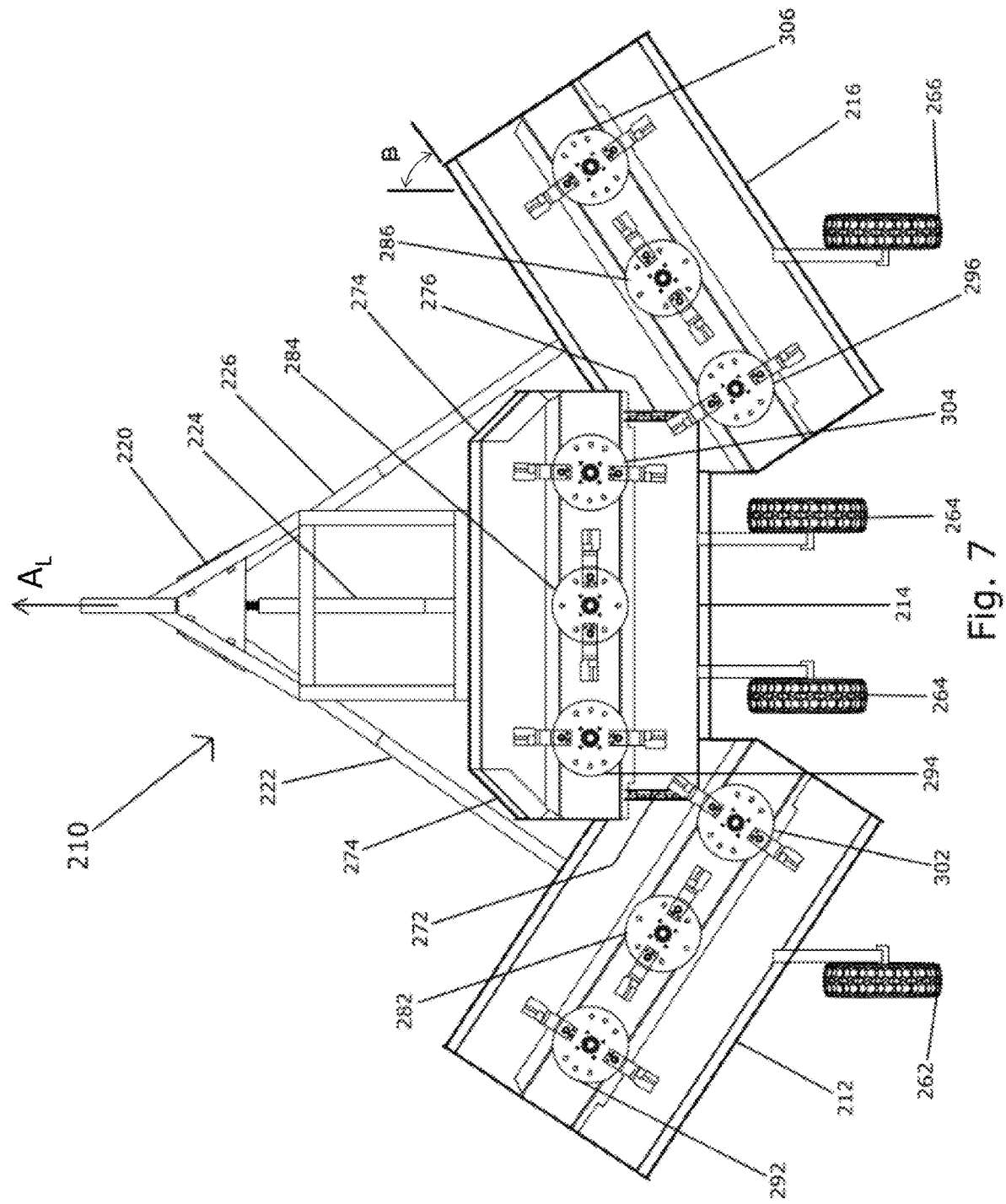
FIG. 7 is a bottom plan view of the adjustable wing mowing machine of FIG. 6.

As shown in FIG. 7, central cutting deck 214 may have one or a plurality of rotating blades disposed on an underside of the deck. For exemplary purposes, central cutting deck 214 is shown with a set of three blades 284, 294, and 304. In some embodiments, the number of blades included below a deck may correspond to the number of gearboxes disposed above the deck. For example, each blade 284, 294, and 304 may be associated with a respective gearbox 234, 244, and 254 on a top side of central cutting deck 214 (see FIG. 6) wherein a gearbox imparts rotational motion to an associated blade by means of a driveshaft onto which the blade is mounted. In some embodiments, the cutting area of adjacent blades may overlap so as to prevent gaps in the cutting pattern of the deck as the deck is pulled forward during mowing operations. Such an overlap may be about 6 inches, for example, or other suitable distance. Gearboxes 234, 244, and 254 may be rotationally timed with respect to one another such that the outer blades 294, 304 may not interfere with the center blade 284. Similarly, swept wing cutting deck 212 may have a similar blade configuration and timing as central cutting deck 214 wherein wing cutting deck 212 includes blades 282, 292, and 302 respectively driven by gearboxes 232, 242, 252. Likewise, swept wing cutting deck 216 may have a similar blade configuration and timing as central cutting deck 214 wherein swept wing cutting deck 216 includes blades 286, 296, and 306 respectively driven by gearboxes 236, 246, 256.

As shown in FIG. 6 & FIG. 7, swept wing cutting decks 212 and 216 may be disposed at an acute angle β that is non-orthogonal with respect to the longitudinal axis $A_L$ such that the swept wing cutting decks 212 and 216 are not parallel with central cutting deck 214 but are swept forward in relation to central cutting deck 214. Alternatively, in some embodiments, angle β may be obtuse and non-orthogonal in relation to the longitudinal axis $A_L$ such that swept wing cutting decks 212, 216 are swept rearward in relation to the central cutting deck 214. In some embodiments, orientation of swept wing cutting decks 212 and 216 at a suitable angle β may permit the blades (e.g., blades 282, 292, 302 of swept wing cutting deck 212, or blades 286, 296, 306 of swept wing cutting deck 216) to be mounted with sufficient spacing from one another that they may rotate in the same plane without hitting one another and without any need for timing (that is, their respective rotary paths may not overlap) while still achieving overlap of the respective mowing paths as the winged mowing machine 210 moves forward. For example, in some embodiments having blades of about 32 inches diameter on a swept wing cutting deck oriented at an angle β of about 34 degrees, the centers of the blades (mounting positions) may be spaced about 36 inches from each other (yielding about 4 inches separation of adjacent rotary blade tip paths) with no need for timing and yet achieve an overlapping forward mowing path of each adjacent blade. Additionally, orientation of swept wing cutting decks 212 and 216 with respect to central cutting deck 214 as shown may create an overlap in cutting paths of inner blades 302, 296 of swept wing cutting decks 212, 216 with respect to the outer blades 294, 304 of central cutting deck 214 such that the overall mowing path of winged mowing machine 210 is uniform and continuous with no un-mowed gaps.

Figure 8:
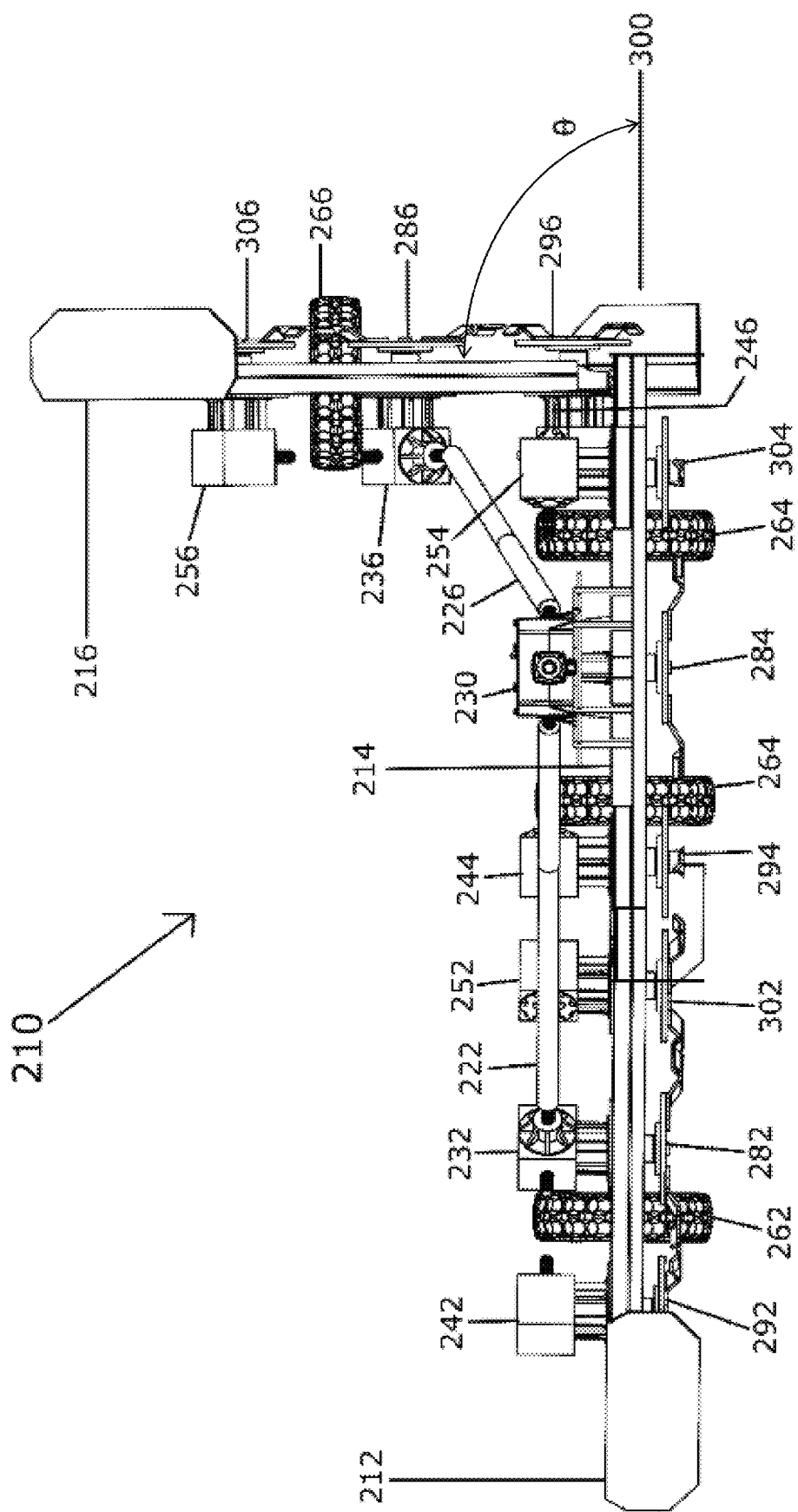
FIG. 8 is a front elevational view of the adjustable wing mowing machine of FIG. 6 wherein one wing is configured upward and normal to a neutral mowing plane.
Figure 9:
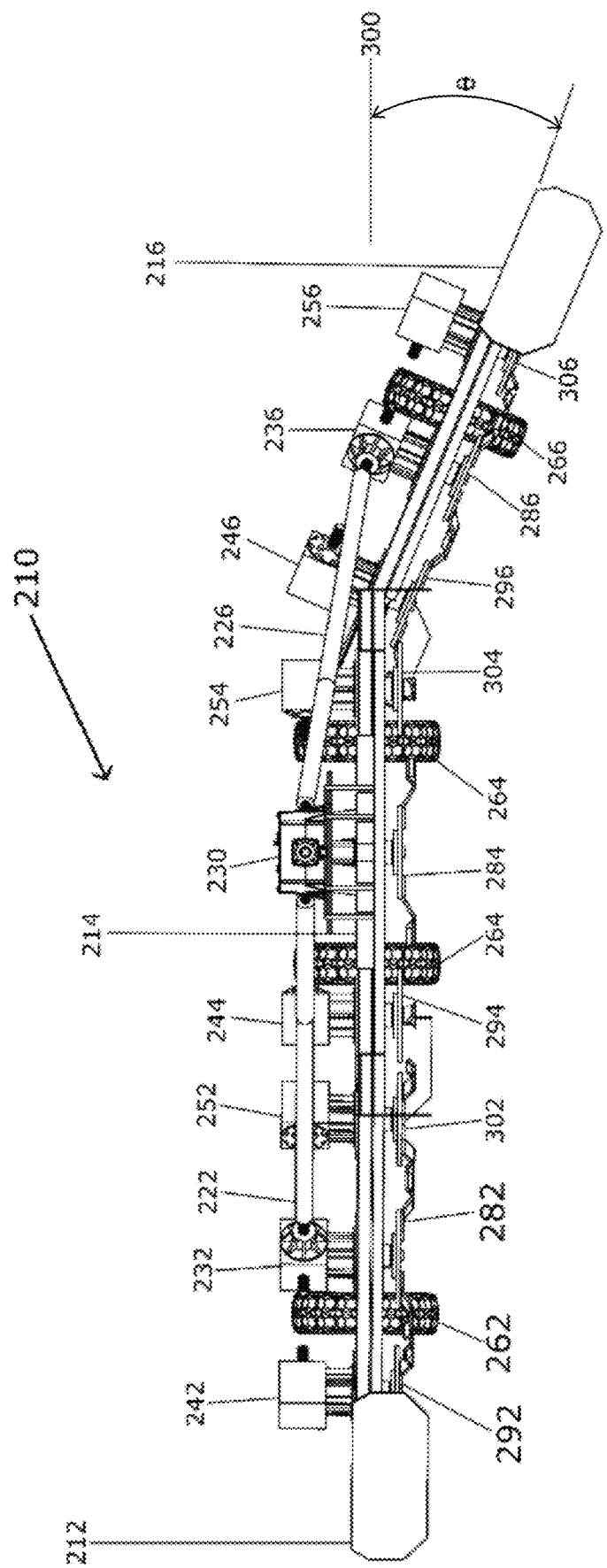
FIG. 9 is a front elevational view of the adjustable wing mowing machine of FIG. 6 wherein one wing is configured downward below a neutral mowing plane.

Due to hinges 272, 276 and the location of main gearbox 230 sufficiently forward of central cutting deck 214 and swept wing cutting decks 212, 216 (e.g., in some embodiments, central cutting deck 214 may be located at about ⅔ the distance from gearbox 230 to swept wing cutting decks 212, 216, or other suitable proportion), as well as the clearance zones between central cutting deck 214 and drivelines 222 and 226 in the vicinity of edges 274, swept wing cutting deck 212 and swept wing cutting deck 216 may rotate a substantial amount in relation to central cutting deck 214. As shown in FIG. 9, all or a substantial portion of a swept wing cutting deck (e.g., swept wing cutting deck 212 or 216) may rotate below the neutral mowing plane 300 to form a negative angle θ in relation to central cutting deck 214. In some embodiments, negative angle θ may include a range of motion from about 0 to negative 30 degrees, or about 0 to negative 45 degrees, or about 0 to negative 60 degrees, or about 0 to negative 90 degrees, for example, and in some embodiments the blades, drivelines, and gearboxes of the respective swept wing cutting deck may remain operational for mowing throughout the entire range of motion. Referring to FIG. 8, it may be seen that a swept wing cutting deck (e.g., swept wing cutting deck 212 or 216) may rotate above the neutral mowing plane 300 to form a positive angle θ in relation to central cutting deck 214. In some embodiments, positive angle θ may include a range of motion from about 0 to 30 degrees, or about 0 to 45 degrees, or about 0 to 60 degrees, or about 0 to 90 degrees, for example, and in some embodiments the blades, drivelines, and gearboxes of the respective swept wing cutting deck may remain operational for mowing throughout the entire range of motion. For example, with swept wing cutting deck 212 or 216 folded upward in a positive 90-degree configuration, a vertical hedge may be mowed. Such a configuration also enables mowing machine 210 to be placed in a compact transport position (e.g., with swept wing cutting decks 212 and 216 folded upward in a positive 90-degree configuration) without requiring disconnection of the drivelines 222, 226 from the respective gearboxes 232, 236 or from main gearbox 230. Such negative and positive rotation of swept wing cutting decks 212, 216 with respect to central cutting deck 214 may allow mowing machine 210 to readily adapt to uneven terrain with little or no input from a user. Alternatively, such negative or positive rotational configurations of swept wing cutting decks 212, 216 may be set by a user, either manually or via a control system. Although two swept wing cutting decks 212 and 216 are illustrated, some embodiments may include only one or the other of swept wing cutting decks 212 and 216.

Figure 10:
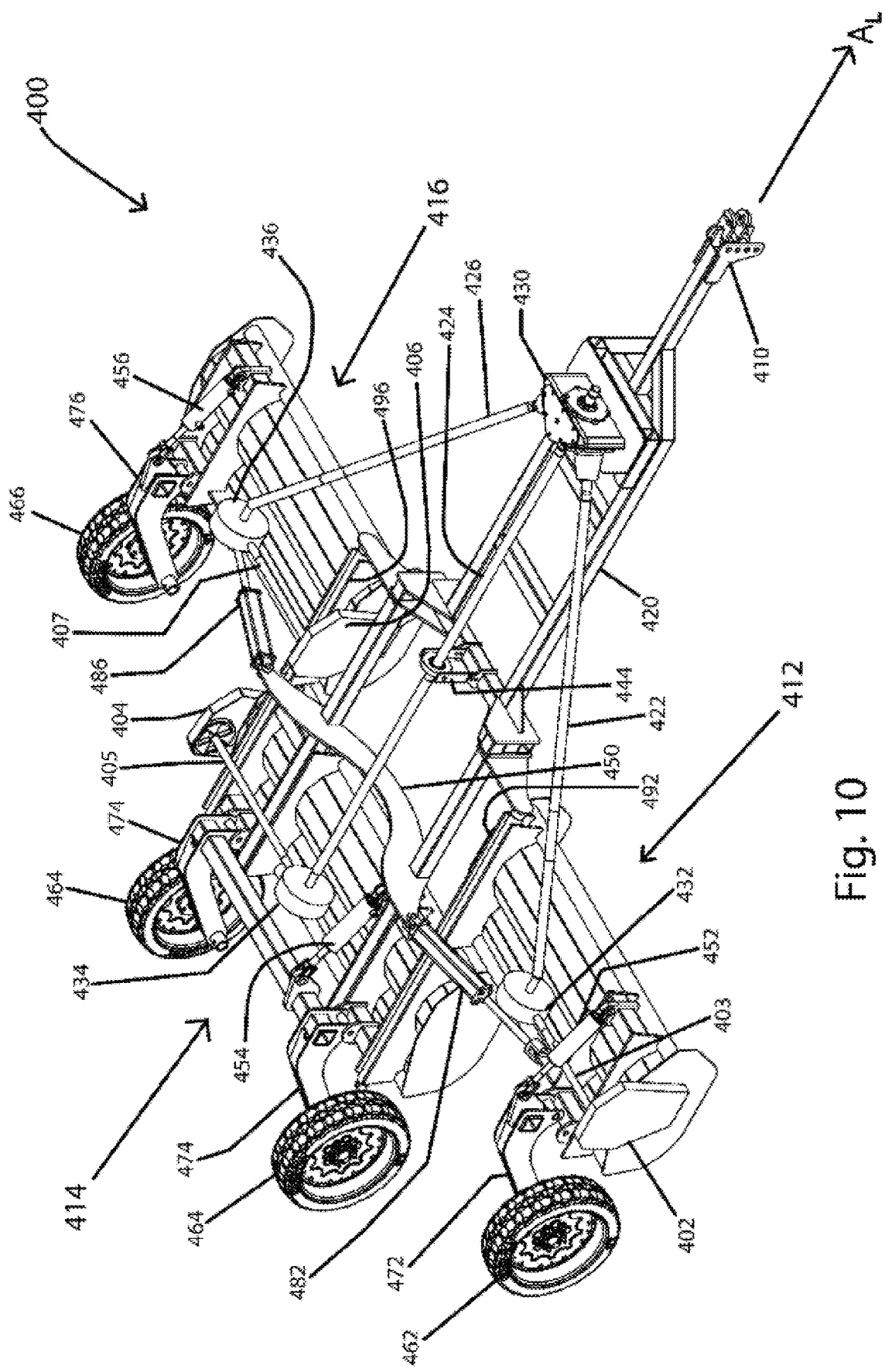
FIG. 10 is a perspective view of yet another embodiment of an adjustable wing mowing machine.

Referring to FIGS. 10-13, some embodiments of a winged mowing machine may include a flail mowing modality. As shown in FIG. 10, a winged flail mowing machine 400 may comprise several main components, including a right wing cutting deck 412, a left wing cutting deck 416, and a central cutting deck 414 supported by a central frame 420. While a single left and right wing cutting deck is shown for exemplary purposes, a plurality of wing cutting decks may be included in some embodiments. Frame 420 may include a tongue and hitch 410 suitable for attachment to a tractor and a main gearbox 430 disposed at a forward top portion of frame 420. Such a hitch 410 may be a 3-point lift, semi-mount, pull-type, or other suitable hitch design. Gearbox 430 may be connected to a power take off (PTO) of a tractor (not shown) either directly or by an intermediate coupling device, depending on the design and dimensions of the tractor. Main gearbox 430 may transfer power from the PTO to a cutting deck gearbox 432, 434, and 436 on each respective cutting deck 412, 414, and 416 via respective drivelines 422, 424, and 426 in order to power a shaft upon which are mounted cutting flails in each respective cutting deck as described further below. In some embodiments, driveline 424 may be supported by a bearing 444 mounted to frame 420 between main gearbox 430 and central deck gearbox 434.

Central cutting deck 414 may be mechanically joined to frame 420, such as by welded connections or bolted connections, for example. However, other joining methods familiar to one skilled in the art may also be utilized in place of welding or bolting, or a combination of such methods may be used. Wing cutting decks 412 and 416 may be pivotally mounted to frame 420 by means of hinge rods 492 and 496, for example, such that the wing cutting decks 412, 416 may respectively rotate about the hinge rods 492, 496 into positions above and below the neutral mowing plane. Although hinge rods 492, 496 are shown generally parallel to longitudinal axis $A_L$, which is generally aligned with the direction of travel, in some embodiments hinge rods 492, 496 may not be parallel to longitudinal axis $A_L$. Wing cutting decks 412 and 416 may be respectively supported by one or more wheels 462 and 466 depending from the respective decks as shown. Wheels 462, 466 may be pivotably disposed respective to wing cutting decks 412, 416 by way of wheel support arms 472 and 476 wherein such pivoting motion may be controlled by hydraulic actuators 452 and 456, respectively, in order to adjust the height of the respective cutting deck 412, 416 above the ground and thereby adjust the cut height. Similarly, central cutting deck 414 may be supported by one or more wheels 464 depending from central cutting deck 414 as shown. Wheels 464 may be pivotably disposed with respect to central cutting deck 414 by way of wheel support arms 474 wherein such pivoting motion may be controlled by hydraulic actuator 454 in order to adjust the height of the central cutting deck 414 above the ground and thereby adjust the cut height.

Figure 11:
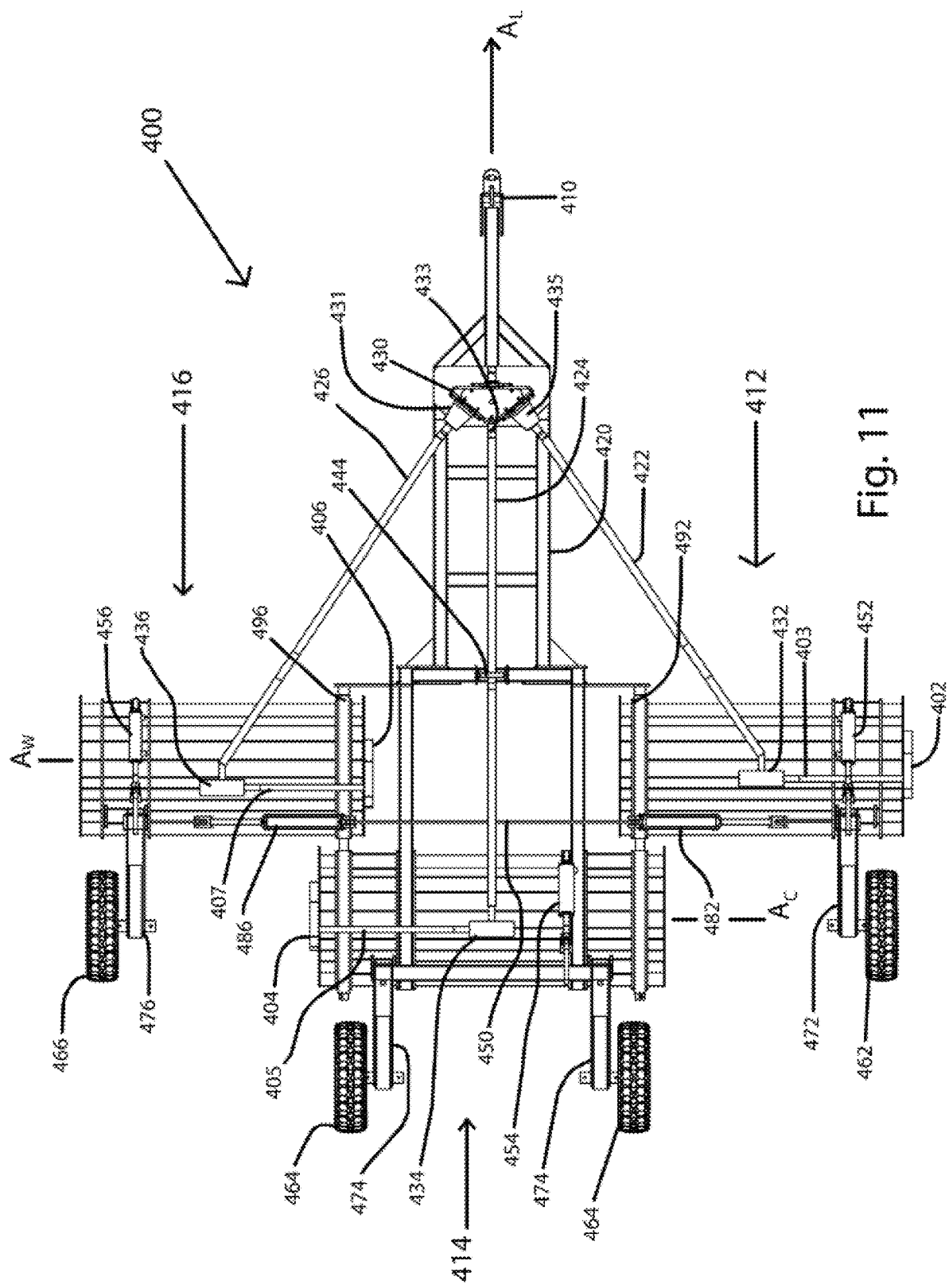
FIG. 11 is a top plan view of the adjustable wing mowing machine of FIG. 10.

As shown in FIGS. 10-11, central cutting deck 414 may have a deck gearbox 434 disposed at a top face thereof. Deck gearbox 434 may be coupled to main gearbox 430 by means of driveline 424 wherein power is transferred from gearbox 430 to gearbox 434, which in turn may transmit power to a flail drive 404 via a driveline 405. Flail drive 404 may drive a flail rotor having multiple flail cutters (not shown) on an underside of central cutting deck 414. Similarly, wing cutting decks 412 and 416 may also have a deck gearbox 432 and 436, respectively, disposed at a top face of the respective cutting decks. Gearbox 432 may be coupled to main gearbox 430 by means of driveline 422 wherein power is transferred from gearbox 430 to gearbox 432, which in turn may transmit power to a flail drive 402 via a driveline 403. Flail drive 402 may drive a flail rotor having multiple flail cutters (not shown) on an underside of wing cutting deck 412. Gearbox 436 may be similarly coupled to main gearbox 430 by means of driveline 426, and gearbox 436 may transmit power to a flail drive 406 via a driveline 407. Flail drive 406 may drive a flail rotor having multiple flail cutters (not shown) on an underside of wing cutting deck 416. Thus, main gearbox 430 may ultimately supply power to one or more flail rotors on an underside of each cutting deck 412, 414, 416.

Wing cutting decks 412, 416 may be disposed forward of central cutting deck 414 wherein said cutting decks may be joined to form an overall cutting machine by means of attachment to central frame 420. Pivot rods 492, 496 may span and also join together central cutting deck 414 and the respective wing cutting decks 412 and 416 so as to form a hinge between each wing cutting deck 412, 416 and central cutting deck 414. The outboard edges of central cutting deck 414 may be overlapped with the inboard edge of wing cutting deck 412 and wing cutting deck 416. Such an overlap may create an overlap of the cutting path of central cutting deck 414 and each wing cutting deck 412, 416 to create a continuous overall cutting path. Such an overlap of cutting paths may be about 6 inches, for example, or other suitable distance. In addition, such an overlap of central cutting deck 414 and wing cutting decks 412, 416 may enable the pivot rods 492 and 496 to span the central cutting deck 414 and the respective wing cutting deck 412, 416. In some embodiments, frame 420 may include a lateral member 450 configured for mounting extendable and retractable elevation arms 482, 486 (e.g., pneumatic or hydraulic cylinders), which may be connected to wing cutting decks 412, 416, respectively, with a pin connection at each end thereof, for example. Elevation arm 482 may be operable to raise and lower wing cutting deck 412 in pivotal motion about pivot rod 492, and elevation arm 486 may be operable to raise and lower wing cutting deck 416 in pivotal motion about pivot rod 496. For example, elevation arms 482, 486 may raise wing cutting decks 412, 416, respectively, to a 90-degree transport position as shown for wing cutting deck 416 in FIG. 12.

Figure 12:
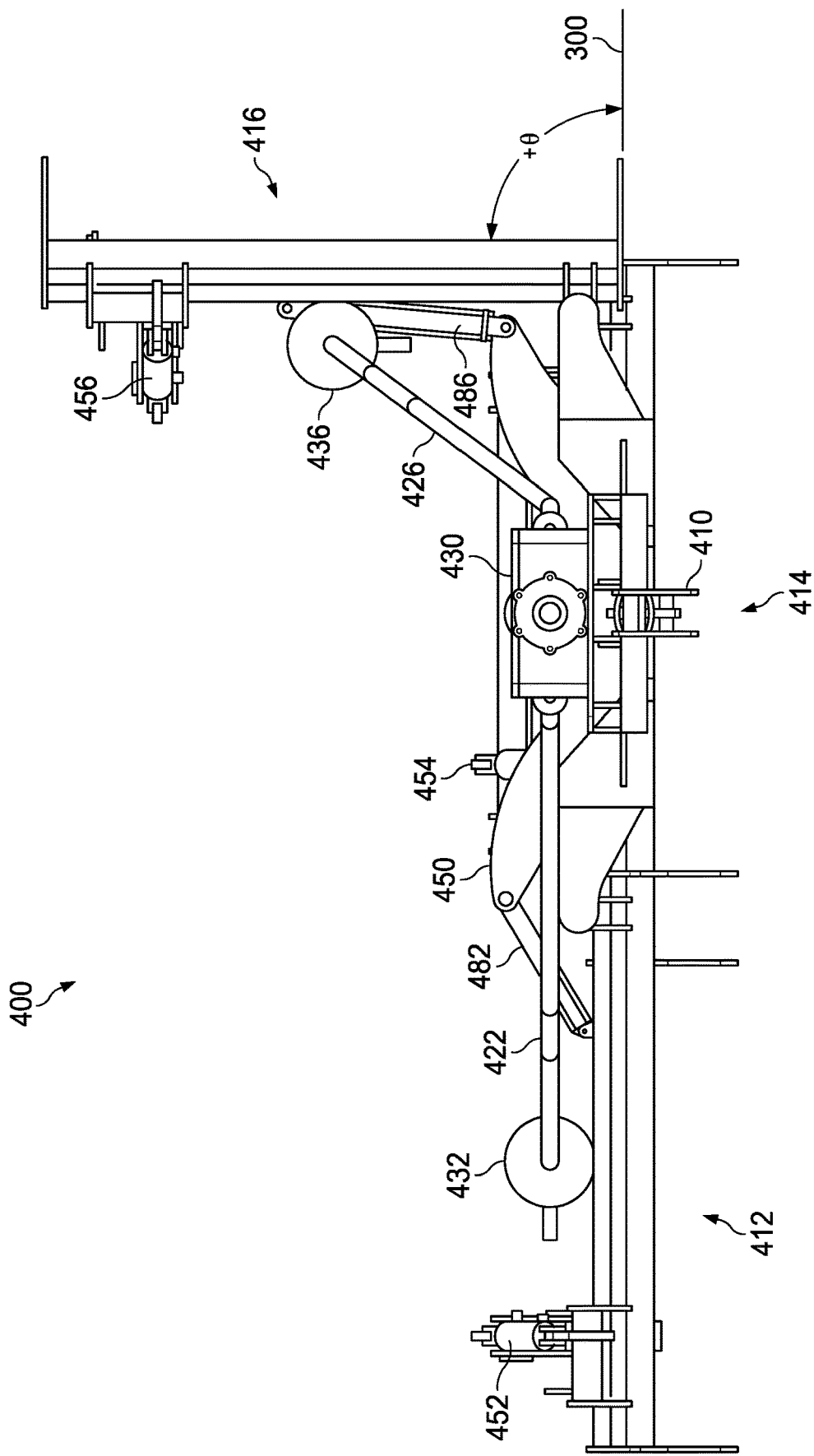
FIG. 12 is a front elevational view of the adjustable wing mowing machine of FIG. 10 shown with one wing configured upward and normal to a neutral mowing plane.
Figure 13:
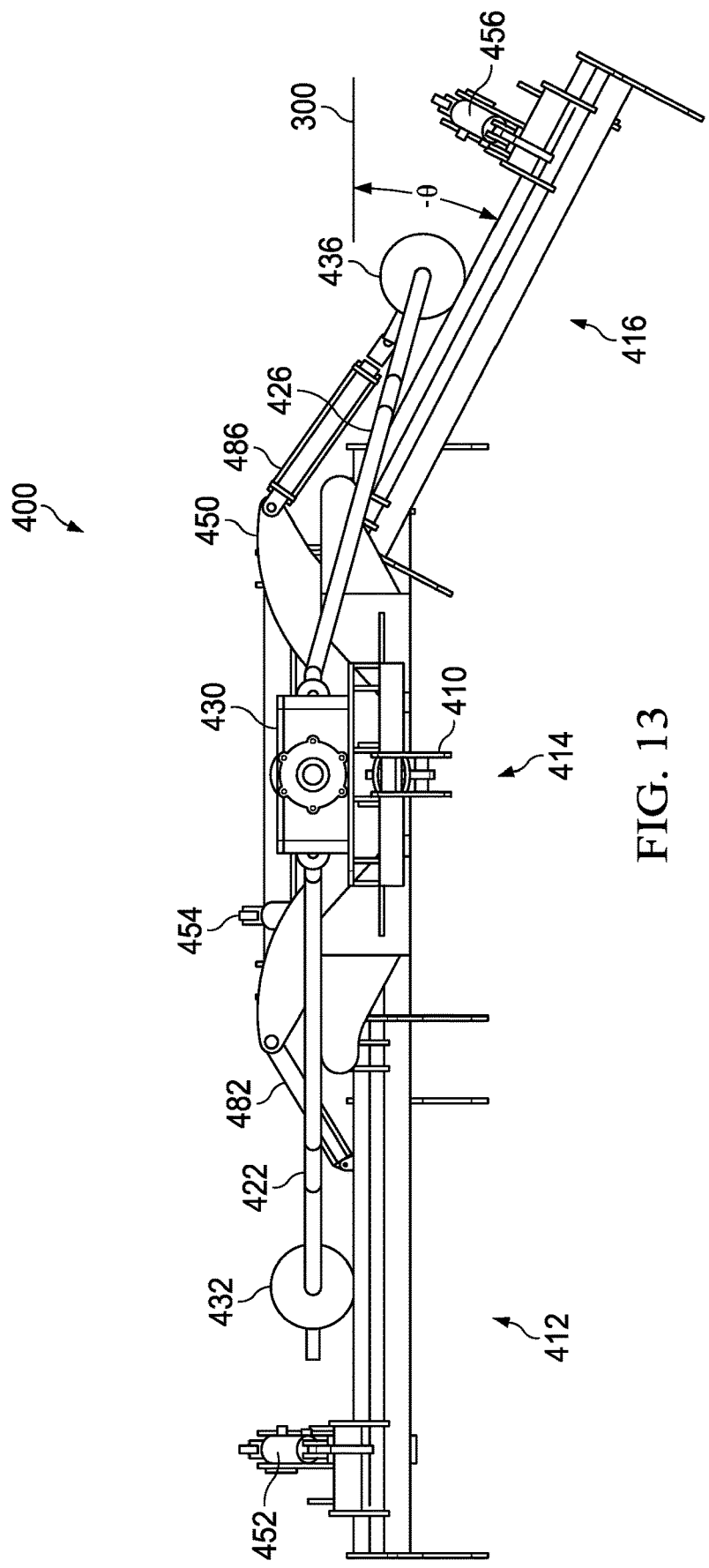
FIG. 13 is a front elevational view of the adjustable wing mowing machine of FIG. 10 shown with one wing configured downward below a neutral mowing plane.

Due to the location of main gearbox 430 sufficiently forward of central cutting deck 414 and wing cutting decks 412, 416 (e.g., in some embodiments, central cutting deck 414 may be located at about ¾ the distance from gearbox 430 to wing cutting decks 412, 416, or other suitable proportion), wing cutting deck 412 and wing cutting deck 416 may rotate a substantial amount in relation to central cutting deck 414 while maintaining operable connections of drivelines 422, 426 between main gearbox 430 and deck gearboxes 432 and 436, respectively. For example, as shown in FIG. 12, all or a substantial portion of a wing cutting deck (e.g., wing cutting deck 412 or 416) may rotate above the neutral mowing plane 300 to form a positive angle θ in relation to central cutting deck 414. The positive angle θ may include a range of motion from about 0 to positive 30 degrees, or about 0 to positive 45 degrees, or about 0 to positive 60 degrees, or about 0 to positive 90 degrees, for example, and in some embodiments the flail cutters, drivelines, gearboxes, and other components associated with the mowing action of the respective wing cutting deck may remain operational for mowing throughout the entire range of motion. Additionally, referring to FIG. 13, it may be seen that a wing cutting deck (e.g., wing cutting deck 412 or 416) may rotate below the neutral mowing plane 300 to form a negative angle θ in relation to central cutting deck 414. Negative angle θ may include a range of motion from about 0 to negative 30 degrees, or about 0 to negative 45 degrees, or about 0 to negative 60 degrees, or about 0 to negative 90 degrees, for example, and in some embodiments the flail cutters, drivelines, gearboxes and other components associated with the mowing action of the respective wing cutting deck may remain operational for mowing throughout the entire range of motion. For example, with wing cutting deck 412 or 416 folded upward in a positive 90-degree configuration, a vertical hedge may be mowed. Such a configuration also enables mowing machine 400 to be placed in a compact transport position (e.g., with wing cutting decks 412 and 416 folded upward in a positive 90-degree configuration) without requiring disconnection of the drivelines 422, 426 from the respective gearboxes 432, 436 or from main gearbox 430. Such negative and positive rotation of wing cutting decks 412, 416 with respect to central cutting deck 414 may allow mowing machine 400 to readily adapt to uneven terrain with little or no input from a user. Alternatively, such negative or positive rotational configurations of wing cutting decks 412, 416 may be set by a user, either manually or via a control system. Some components such as flail drives 402, 404, 406, drivelines 403, 405, 407, and wheels 462, 464, 466 are not shown in FIGS. 12 & 13 for the sake of simplicity and clarity.

Although two wing cutting decks 412 and 416 are illustrated, some embodiments may include only one or the other of wing cutting decks 412 and 416. Also, although wing cutting decks 412 and 416 are shown in a straight lateral configuration in which the axes of rotation $A_W$ of the wing flail rotors are oriented substantially parallel to the axis of rotation $A_C$ of the central flail rotor and substantially perpendicular to longitudinal axis $A_L$, in some embodiments wing cutting decks 412 and 416 may be swept forward or rearward similar to wing cutting decks 212 and 216 described above such that the axes of rotation $A_W$ of the wing flail rotors are not substantially parallel to the axis of rotation $A_C$ of the central flail rotor and are not substantially perpendicular to longitudinal axis $A_L$.

Figure 14:
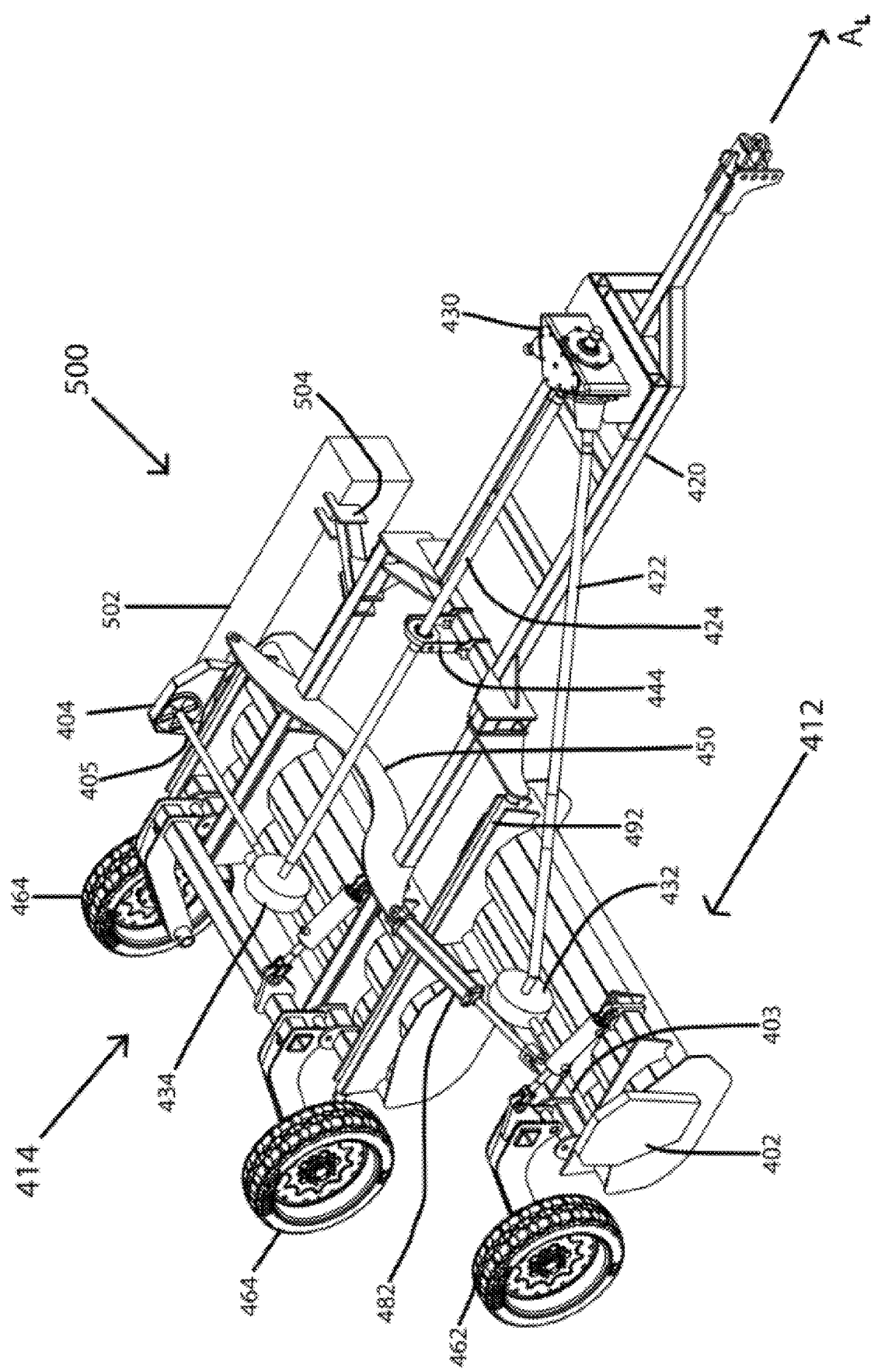
FIG. 14 is a perspective view of still another embodiment of an adjustable wing mowing machine.
Figure 15:
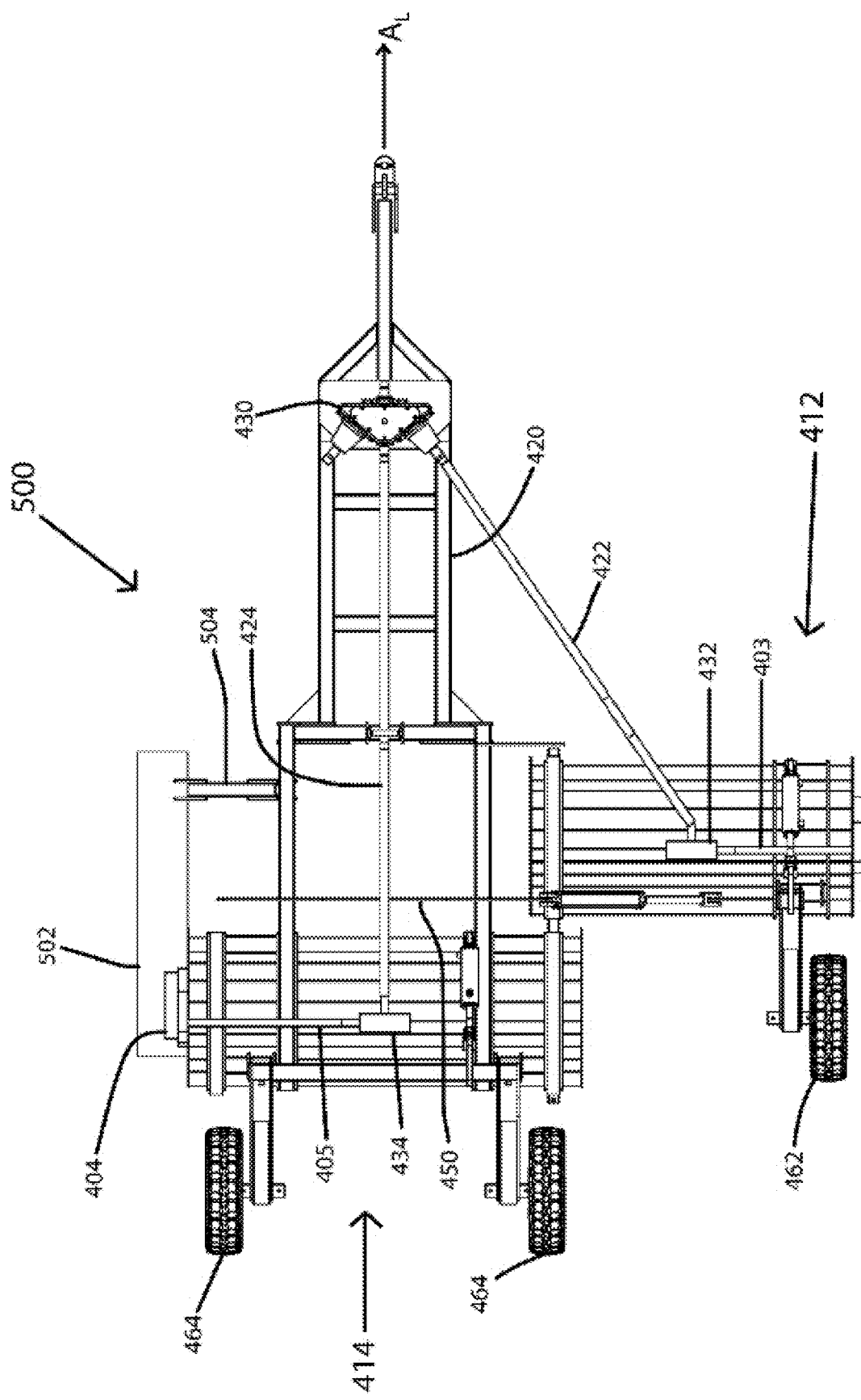
FIG. 15 is a top plan view of the adjustable wing mowing machine of FIG. 14.

For example, as shown in FIGS. 14 & 15, a winged flail mowing machine 500 may be substantially the same as winged flail mowing machine 400 described above except that left wing cutting deck 416 may be replaced by a counterweight 502, which may be attached to frame 420 by one or more arms 504. Counterweight 502 may be sized and configured with a mass distribution and moment about longitudinal axis $A_L$ as a counterbalance with respect to right wing cutting deck 412. In some embodiments, the one or more arms 504 may extend and retract and/or raise and lower (e.g., by means of hydraulic or pneumatic cylinders) counterweight 502 to more effectively counterbalance right wing cutting deck 412 as right wing cutting deck 412 is raised and lowered as described above. Alternatively, in some embodiments, counterweight 502 may be substituted in place of right wing cutting deck 412, and left wing cutting deck 416 may be kept in place as described above.

Figure 16:
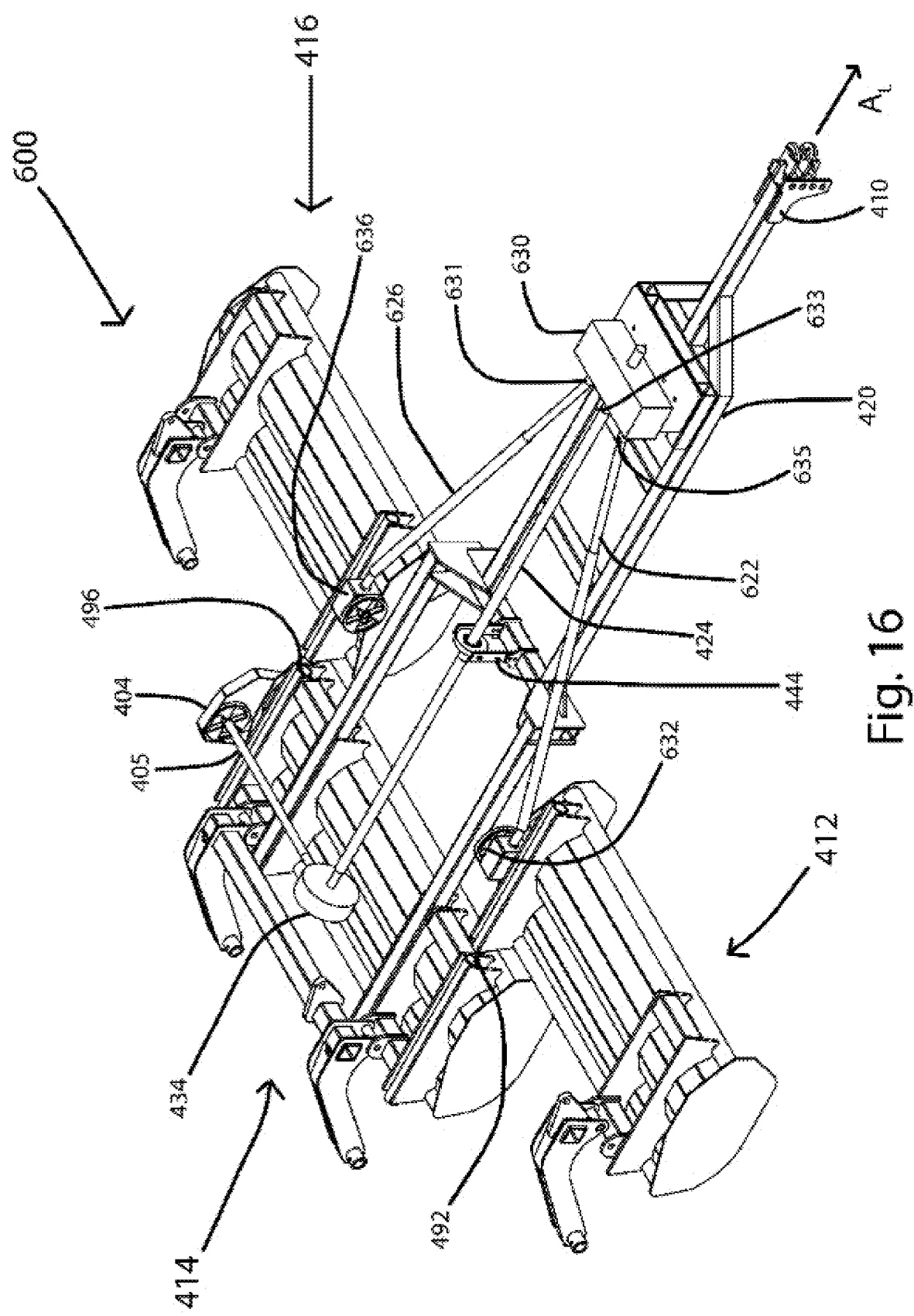
FIG. 16 is a perspective view of still another embodiment of an adjustable wing mowing machine.
Figure 17:
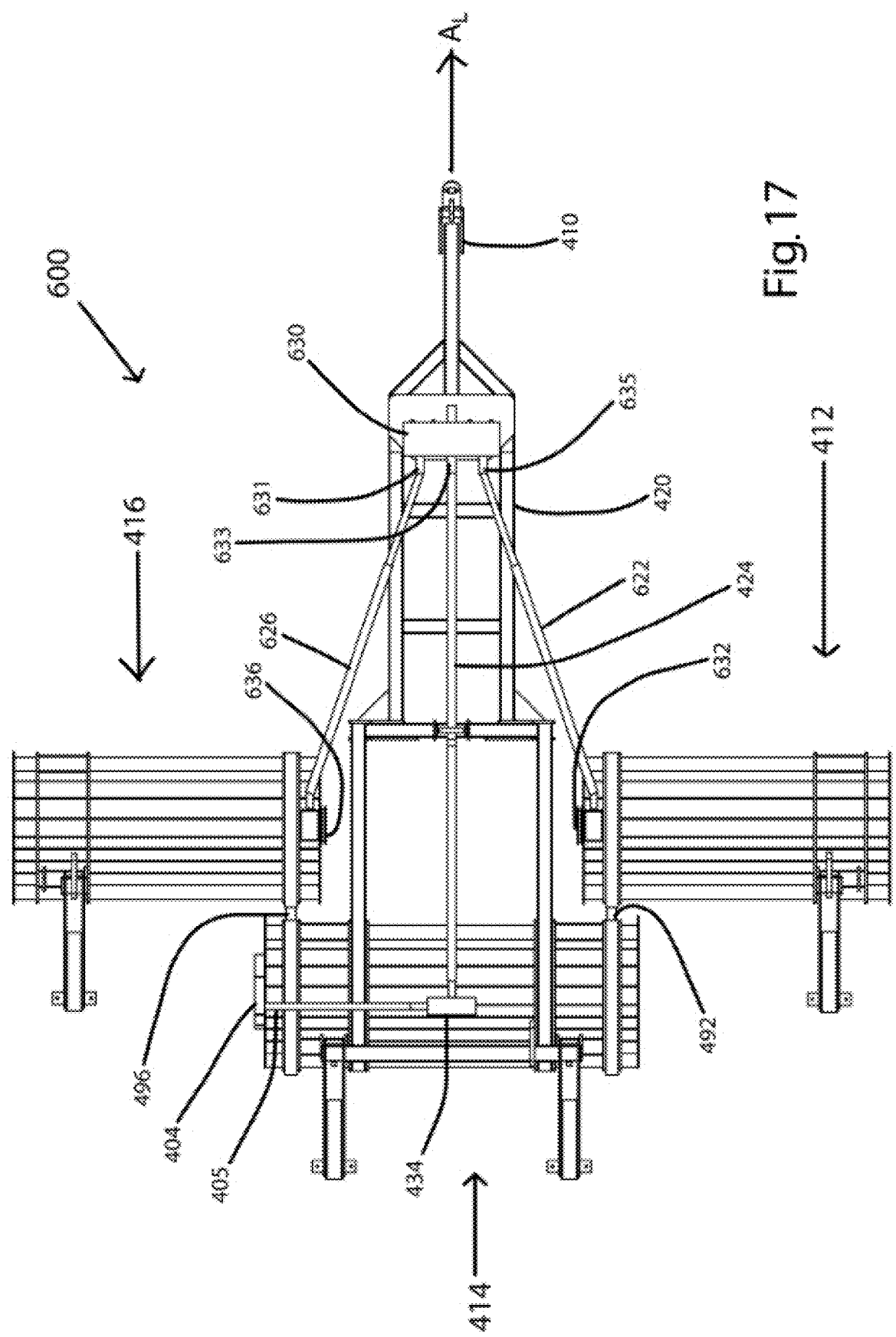
FIG. 17 is a top plan view of the adjustable wing mowing machine of FIG. 16.

Similarly, as shown in FIGS. 16 & 17, a winged flail mowing machine 600 may be substantially the same as winged flail mowing machine 400 described above (see FIGS. 10-13) except that main gearbox 430 may be replaced by a main gearbox 630, and deck gearboxes 432 and 436 may be replaced by deck gearboxes 632 and 636, respectively. Some components such as wheels, actuators, stiffeners, and the like are not shown in FIGS. 16 & 17 for simplicity and clarity. Unlike main gearbox 430, which has driveline connections 431, 433, 435 that are substantially aligned with their respective drivelines 426, 424, 422 such that driveline connections 431 and 435 are angled outward, main gearbox 630 may have driveline connections 631, 633, 635 (which are respectively connected to drivelines 626, 424, 622) that are oriented substantially parallel to longitudinal axis $A_L$, which may allow for a simpler and less expensive main gearbox/drivetrain design. Also, with deck gearboxes 632 and 636 located just inboard of the hinge rods 492 and 496, respectively, and hence near the axis of rotation of the respective wing cutting deck 412 and 416, the range of movement of the deck gearboxes 632 and 636 themselves may be significantly reduced, thereby reducing the overall range of movement of the respective drivelines 622, 626 while still achieving a full range of rotation (e.g., plus or minus 90 degrees) of the wing cutting decks 412, 416. For example, in some embodiments, the orientation of the wing drivelines 622, 626 may be maintained within a range of angulation between the respective deck gearbox 632, 636 and main gearbox 630 of about +18 degrees to about −22 degrees as compared to the orientation of wing drivelines 622, 626 when the wing cutting decks 412, 416 are oriented in a neutral mowing plane.

Although the disclosed subject matter and its advantages have been described in detail, it should be understood that various changes, substitutions and alterations can be made herein without departing from the subject matter as defined by the appended claims and their legal equivalents. Among other things, any feature described for one embodiment may be used in any other embodiment, and any feature described herein may be used independently or in combination with other features. Also, unless the context indicates otherwise, it should be understood that when a component is described herein as being mounted to another component, such mounting may be direct with no intermediate components or indirect with one or more intermediate components. Moreover, the scope of the present application is not intended to be limited to the particular embodiments of the process, machine, manufacture, composition, or matter, means, methods and steps described in the specification. As one will readily appreciate from the disclosure, processes, machines, manufactures, compositions of matter, means, methods, or steps, presently existing or later to be developed that perform substantially the same function or achieve substantially the same result as the corresponding embodiments described herein may be utilized. Accordingly, the appended claims are intended to include within their scope such processes, machines, manufactures, compositions of matter, means, methods, systems or steps.

What is claimed is:

1. A mowing machine configured to be pulled by a tractor in a direction of travel along a longitudinal axis of the mowing machine, said mowing machine comprising:
 a frame;
 a main gearbox mounted to a forward portion of said frame, said main gearbox configured for coupling to a power takeoff of the tractor;
 a central cutting deck mounted to a rear portion of said frame and spaced apart from said main gearbox, said central cutting deck being generally disposed in a neutral mowing plane;
 a central gearbox mounted to said central cutting deck and coupled to said main gearbox with a central driveline, said central gearbox being operably coupled to a central cutting blade;
 a wing cutting deck pivotally connected to said central cutting deck or said frame via a hinge;
 a wing gearbox mounted to said wing cutting deck and coupled to said main gearbox with a wing driveline, said wing gearbox being operably coupled to a wing cutting blade;
 at least one wheel supporting said central cutting deck; and
 at least one wheel supporting said wing cutting deck;
 wherein said main gearbox is disposed a sufficient distance forward of said central cutting deck and said wing cutting deck to permit said wing cutting deck to pivot about said hinge in a range of motion from a maximum downward angle with respect to said neutral mowing plane to a maximum upward angle with respect to said neutral mowing plane without disconnecting said wing driveline from either said main gearbox or said wing gearbox; and
 wherein said central cutting deck comprises a planform shape that permits clearance of said wing driveline with respect to said central cutting deck during a downward portion of said range of motion wherein at least a portion of said wing driveline is disposed below said neutral mowing plane.

2. The mowing machine of claim 1 wherein said wing driveline and said wing gearbox are operable to drive said wing cutting blade throughout said range of motion.

3. The mowing machine of claim 2 wherein said maximum downward angle is between about 30 degrees and about 90 degrees.

4. The mowing machine of claim 2 wherein said maximum upward angle is about 90 degrees.

5. The mowing machine of claim 1 wherein said wing cutting deck is oriented at a non-orthogonal sweep angle with respect to the longitudinal axis.

6. The mowing machine of claim 5 wherein said wing cutting deck comprises a swept forward orientation.

7. The mowing machine of claim 1 wherein said central cutting deck is disposed at about ⅔ to about ¾ of a distance from said main gearbox to said wing cutting deck.

8. The mowing machine of claim 1 wherein said wing cutting deck comprises a first wing cutting deck disposed on a first side of the longitudinal axis, and further comprising:
a second wing cutting deck disposed on an opposite side of the longitudinal axis from the first wing cutting deck, said second wing cutting deck pivotally connected to said central cutting deck or said frame about a second hinge;
a second wing gearbox mounted to said second wing cutting deck and coupled to said main gearbox with a second wing driveline, said second wing gearbox being operably coupled to a second wing cutting blade; and
at least one wheel supporting said second wing cutting deck;
wherein said main gearbox is disposed a sufficient distance forward of said central cutting deck and said second wing cutting deck to permit said second wing cutting deck to pivot about said second hinge in a second range of motion from said maximum downward angle with respect to said neutral mowing plane to said maximum upward angle with respect to said neutral mowing plane without disconnecting said second wing driveline from either said main gearbox or said second wing gearbox; and
wherein said central cutting deck comprises a planform shape that permits clearance of said second wing driveline with respect to said central cutting deck during a downward portion of said second range of motion wherein at least a portion of said second wing driveline is disposed below said neutral mowing plane.

9. A mowing machine configured to be pulled by a tractor in a direction of travel along a longitudinal axis of the mowing machine, said mowing machine comprising:
a frame;
a main gearbox mounted to a forward portion of said frame, said main gearbox configured for coupling to a power takeoff of the tractor;
a central cutting deck mounted to a rear portion of said frame and spaced apart from said main gearbox, said central cutting deck being generally disposed in a neutral mowing plane;
a central gearbox mounted to said central cutting deck and coupled to said main gearbox with a central driveline, said central gearbox being operably coupled to a central flail rotor having a plurality of flail cutters and being rotatable about a first axis;
a wing cutting deck pivotally connected to at least one of said central cutting deck and said frame via a hinge;
a wing gearbox mounted to said wing cutting deck and coupled to said main gearbox with a wing driveline, said wing gearbox being operably coupled to a wing flail rotor having a plurality of flail cutters and being rotatable about a second axis;
at least one wheel supporting said central cutting deck; and
at least one wheel supporting said wing cutting deck;
wherein said main gearbox is disposed a sufficient distance forward of said central cutting deck and said wing cutting deck to permit said wing cutting deck to pivot about said hinge in a range of motion from a maximum downward angle with respect to said neutral mowing plane to a maximum upward angle with respect to said neutral mowing plane without disconnecting said wing driveline from either said main gearbox or said wing gearbox; and
wherein said central cutting deck comprises a planform shape that permits clearance of said wing driveline with respect to said central cutting deck during a downward portion of said range of motion wherein at least a portion of said wing driveline is disposed below said neutral mowing plane.

10. The mowing machine of claim 9 wherein said wing driveline and said wing gearbox are operable to drive said wing flail rotor throughout said range of motion.

11. The mowing machine of claim 10 wherein said maximum downward angle is between about 30 degrees and about 90 degrees.

12. The mowing machine of claim 10 wherein said maximum upward angle is about 90 degrees.

13. The mowing machine of claim 9 wherein said first axis and said second axis are substantially parallel to each other.

14. The mowing machine of claim 13 wherein said first axis and said second axis are substantially perpendicular to said longitudinal axis.

15. The mowing machine of claim 9 wherein said second axis is not substantially perpendicular to said longitudinal axis.

16. A mowing machine configured to be pulled by a tractor in a direction of travel along a longitudinal axis of the mowing machine, said mowing machine comprising:
a frame;
a main gearbox mounted to a forward portion of said frame, said main gearbox configured for coupling to a power takeoff of the tractor;
a central cutting deck mounted to a rear portion of said frame and spaced apart from said main gearbox, said central cutting deck being generally disposed in a neutral mowing plane;
a central gearbox mounted to said central cutting deck and coupled to said main gearbox with a central driveline, said central gearbox being operably coupled to a central flail rotor having a plurality of flail cutters and being rotatable about a first axis;
a wing cutting deck pivotally connected to at least one of said central cutting deck and said frame via a hinge;
a wing gearbox mounted to said wing cutting deck and coupled to said main gearbox with a wing driveline, said wing gearbox being operably coupled to a wing flail rotor having a plurality of flail cutters and being rotatable about a second axis;
at least one wheel supporting said central cutting deck; and
at least one wheel supporting said wing cutting deck;
wherein said main gearbox is disposed a sufficient distance forward of said central cutting deck and said wing cutting deck to permit said wing cutting deck to pivot about said hinge in a range of motion from a maximum downward angle of about 90 degrees with respect to said neutral mowing plane to a maximum upward angle of about 90 degrees with respect to said neutral mowing plane without disconnecting said wing driveline from either said main gearbox or said wing gearbox.

17. The mowing machine of claim 16 further comprising a counterweight attached to said frame at a location substantially opposite said wing cutting deck.

18. The mowing machine of claim 16 wherein said wing gearbox is disposed proximate and inboard of said hinge.

19. The mowing machine of claim 18 wherein said main gearbox comprises a connection to said wing driveline that is substantially parallel to said longitudinal axis.

20. A mowing machine configured to be pulled by a tractor in a direction of travel along a longitudinal axis of the mowing machine, said mowing machine comprising:
a frame;
a main gearbox mounted to a forward portion of said frame, said main gearbox configured for coupling to a power takeoff of the tractor;
a central cutting deck mounted to a rear portion of said frame and spaced apart from said main gearbox, said central cutting deck being generally disposed in a neutral mowing plane;
a central gearbox mounted to said central cutting deck and coupled to said main gearbox with a central driveline, said central gearbox being operably coupled to a central cutting tool;
a wing cutting deck pivotally connected to said central cutting deck or said frame via a hinge;
a wing gearbox mounted to said wing cutting deck and coupled to said main gearbox with a wing driveline, said wing gearbox being operably coupled to a wing cutting tool;
at least one wheel supporting said central cutting deck; and
at least one wheel supporting said wing cutting deck;
wherein said main gearbox is disposed a sufficient distance forward of said central cutting deck and said wing cutting deck to permit said wing cutting deck to pivot about said hinge in a range of motion from a maximum downward angle with respect to said neutral mowing plane to a maximum upward angle with respect to said neutral mowing plane without disconnecting said wing driveline from either said main gearbox or said wing gearbox; and
wherein said central cutting deck comprises a planform shape that permits clearance of said wing driveline with respect to said central cutting deck during a downward portion of said range of motion wherein at least a portion of said wing driveline is disposed below said neutral mowing plane.

21. The mowing machine of claim 20 wherein said central cutting tool is selected from a rotary cutting blade and a flail rotor having a plurality of flail cutters.

22. The mowing machine of claim 20 wherein said wing cutting tool is selected from a rotary cutting blade and a flail rotor having a plurality of flail cutters.

23. The mowing machine of claim 20 wherein said wing driveline and said wing gearbox are operable to drive said wing cutting tool throughout said range of motion.

24. The mowing machine of claim 23 wherein said maximum downward angle is between about 30 degrees and about 90 degrees.

25. The mowing machine of claim 23 wherein said maximum upward angle is about 90 degrees.

26. The mowing machine of claim 20 wherein said wing cutting deck is oriented at a non-orthogonal sweep angle with respect to the longitudinal axis.

27. The mowing machine of claim 26 wherein said wing cutting deck comprises a swept forward orientation.

28. The mowing machine of claim 20 wherein said central cutting deck is disposed at about ⅔ to about ¾ of a distance from said main gearbox to said wing cutting deck.

29. The mowing machine of claim 20 wherein said wing cutting deck comprises a first wing cutting deck disposed on a first side of the longitudinal axis, and further comprising:
a second wing cutting deck disposed on an opposite side of the longitudinal axis from the first wing cutting deck, said second wing cutting deck pivotally connected to said central cutting deck or said frame about a second hinge;
a second wing gearbox mounted to said second wing cutting deck and coupled to said main gearbox with a second wing driveline, said second wing gearbox being operably coupled to a second wing cutting tool; and
at least one wheel supporting said second wing cutting deck;
wherein said main gearbox is disposed a sufficient distance forward of said central cutting deck and said second wing cutting deck to permit said second wing cutting deck to pivot about said second hinge in a second range of motion from said maximum downward angle with respect to said neutral mowing plane to said maximum upward angle with respect to said neutral mowing plane without disconnecting said second wing driveline from either said main gearbox or said second wing gearbox; and
wherein said central cutting deck comprises a planform shape that permits clearance of said second wing driveline with respect to said central cutting deck during a downward portion of said second range of motion wherein at least a portion of said second wing driveline is disposed below said neutral mowing plane.

30. The mowing machine of claim 20 wherein:
said central cutting tool comprises a first flail rotor having a plurality of flail cutters and being rotatable about a first axis;
said wing cutting tool comprises a second flail rotor having a plurality of flail cutters and being rotatable about a second axis; and
said first axis and said second axis are substantially parallel to each other.

31. The mowing machine of claim 30 wherein said first axis and said second axis are substantially perpendicular to said longitudinal axis.

32. The mowing machine of claim 20 wherein:
said central cutting tool comprises a first flail rotor having a plurality of flail cutters and being rotatable about a first axis;
said wing cutting tool comprises a second flail rotor having a plurality of flail cutters and being rotatable about a second axis; and
said second axis is not substantially perpendicular to said longitudinal axis.

33. The mowing machine of claim 20 further comprising a counterweight attached to said frame at a location substantially opposite said wing cutting deck.

34. The mowing machine of claim 20 wherein said wing gearbox is disposed proximate and inboard of said hinge.

35. The mowing machine of claim 34 wherein said main gearbox comprises a connection to said wing driveline that is substantially parallel to said longitudinal axis.

\* \* \* \* \*